(12) United States Patent
Smith et al.

(10) Patent No.: US 9,035,180 B2
(45) Date of Patent: May 19, 2015

(54) ACTIVE COVER PLATES

(71) Applicant: SnapRays LLC, Orem, UT (US)

(72) Inventors: Jeremy Smith, Orem, UT (US); Phil Dietz, St. George, UT (US); Sean Watkins, Orem, UT (US); Jan Finlinson, Lindon, UT (US); Martin Johnson, Draper, UT (US); Jeremy Willden, Pleasant Grove, UT (US)

( * ) Notice: Subject to any disclaimer, the term of this patent is extended or adjusted under 35 U.S.C. 154(b) by 0 days.

(21) Appl. No.: 14/066,621

(22) Filed: Oct. 29, 2013

(65) Prior Publication Data

US 2014/0054059 A1  Feb. 27, 2014

Related U.S. Application Data

(63) Continuation-in-part of application No. 13/461,915, filed on May 2, 2012, now Pat. No. 8,912,442.

(60) Provisional application No. 61/720,131, filed on Oct. 30, 2012, provisional application No. 61/778,386, filed on Mar. 12, 2013, provisional application No. 61/836,972, filed on Jun. 19, 2013, provisional application No. 61/574,344, filed on Aug. 1, 2011.

(51) Int. Cl.
*H02G 3/14* (2006.01)
*H02G 3/08* (2006.01)

(52) U.S. Cl.
CPC . *H02G 3/081* (2013.01); *H02G 3/14* (2013.01)

(58) Field of Classification Search
USPC .............. 174/66, 67; 220/241, 242; 439/136, 439/143; 312/326; 362/95
See application file for complete search history.

(56) References Cited

U.S. PATENT DOCUMENTS

| | | | |
|---|---|---|---|
| 2,015,698 A | 12/1933 | Tiffany | |
| 2,045,199 A | 6/1936 | Petersen | |
| 2,227,549 A | 1/1941 | McNeill | |
| 2,575,820 A | 11/1951 | Linton | |
| 2,580,056 A | 12/1951 | Wheeler | |
| 2,749,381 A | 6/1956 | Farish | |
| 2,880,285 A | 3/1959 | Robison | |
| 2,908,743 A | 10/1959 | Premoshis | |
| 2,934,590 A | 4/1960 | Thompson | |
| 3,120,414 A | 2/1964 | Farish | |
| 3,522,595 A | 8/1970 | White | |
| 3,680,237 A | 8/1972 | Finnerty | |
| 3,859,454 A | 1/1975 | Mann | |
| 4,000,405 A * | 12/1976 | Horwinski | ...................... 362/95 |
| 4,038,582 A * | 7/1977 | Horwinski | .................... 315/129 |
| 4,282,591 A | 8/1981 | Andreuccetti | |
| 4,534,486 A | 8/1985 | Eidson | |
| 4,617,613 A | 10/1986 | Rice | |

(Continued)

FOREIGN PATENT DOCUMENTS

CN 201311835 9/2009
WO PCT/US2012/046946 11/2012
WO PCT/US2013/067456 2/2014

*Primary Examiner* — Dhirubhai R Patel
(74) *Attorney, Agent, or Firm* — R. Camden Robinson

(57) ABSTRACT

In one example, an active cover plate includes a faceplate, a load and a spring clip extending rearward from the faceplate to interface with a receptacle body, wherein the spring clip includes a flexible conductive portion connected to the face plate by a first end and a non-conductive portion connected to an opposite end of the flexible conductive portion, wherein the spring clips extract electrical power from the receptacle body to energize the load.

17 Claims, 19 Drawing Sheets

(56) References Cited

U.S. PATENT DOCUMENTS

| | | | |
|---|---|---|---|
| 4,774,641 | A | 9/1988 | Rice |
| 5,016,398 | A | 5/1991 | Fukunaga |
| 5,384,428 | A | 1/1995 | Luu |
| 5,485,356 | A * | 1/1996 | Nguyen .................. 362/95 |
| 5,670,776 | A | 9/1997 | Rothbaum |
| 5,683,166 | A * | 11/1997 | Lutzker .................. 362/84 |
| 5,816,682 | A | 10/1998 | Marischen |
| 6,087,588 | A | 7/2000 | Soules |
| 6,395,981 | B1 | 5/2002 | Ford |
| 6,423,900 | B1 * | 7/2002 | Soules .................. 174/66 |
| 6,883,927 | B2 * | 4/2005 | Cunningham et al. ....... 362/95 |
| 7,247,793 | B2 | 7/2007 | Hinkson |
| 7,360,912 | B1 | 4/2008 | Savicki, Jr. |
| 7,506,990 | B2 | 3/2009 | Glazner |
| 8,304,652 | B2 | 11/2012 | McBain |
| 8,668,347 | B2 * | 3/2014 | Ebeling .................. 362/95 |
| 2001/0046130 | A1 | 11/2001 | Cunningham |
| 2003/0124022 | A1 | 7/2003 | Georges |
| 2006/0072302 | A1 | 4/2006 | Chien |
| 2009/0284385 | A1 | 11/2009 | Tang et al. |
| 2012/0068612 | A1 | 3/2012 | Ebeling |
| 2012/0156937 | A1 | 6/2012 | Almouli |
| 2013/0221868 | A1 | 8/2013 | Diotte |

* cited by examiner

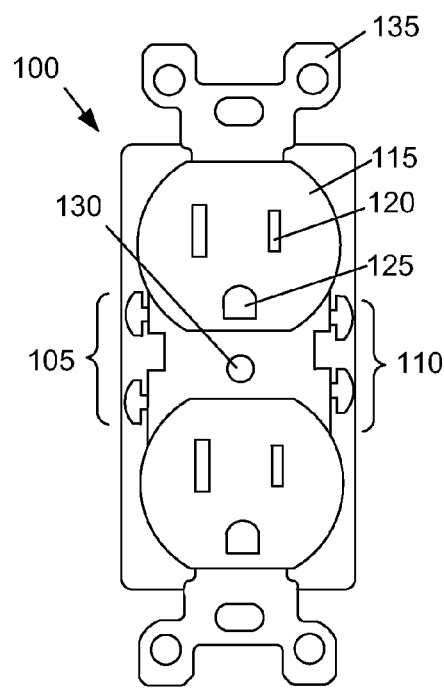
*Fig. 1A*
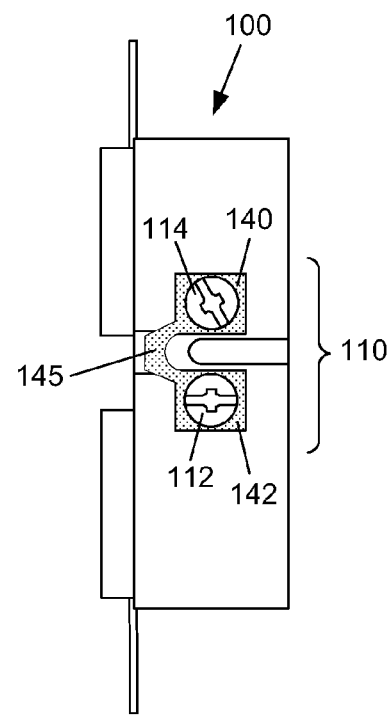
*Fig. 1B*
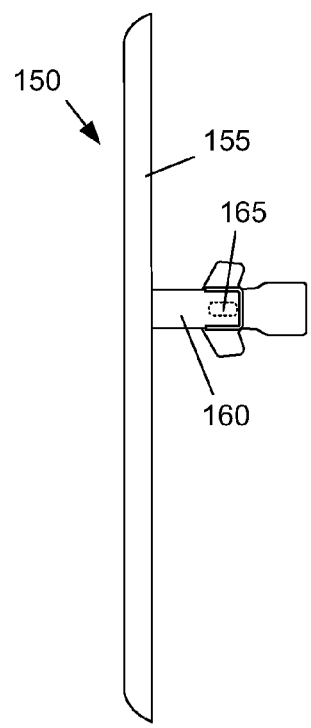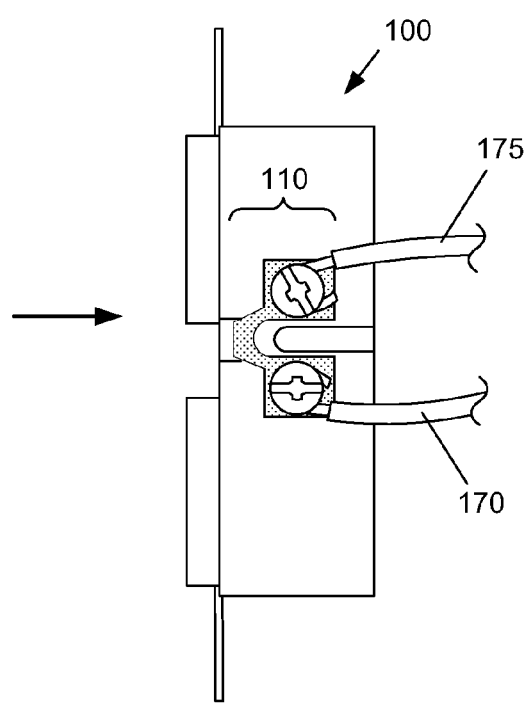
*Fig. 1C*

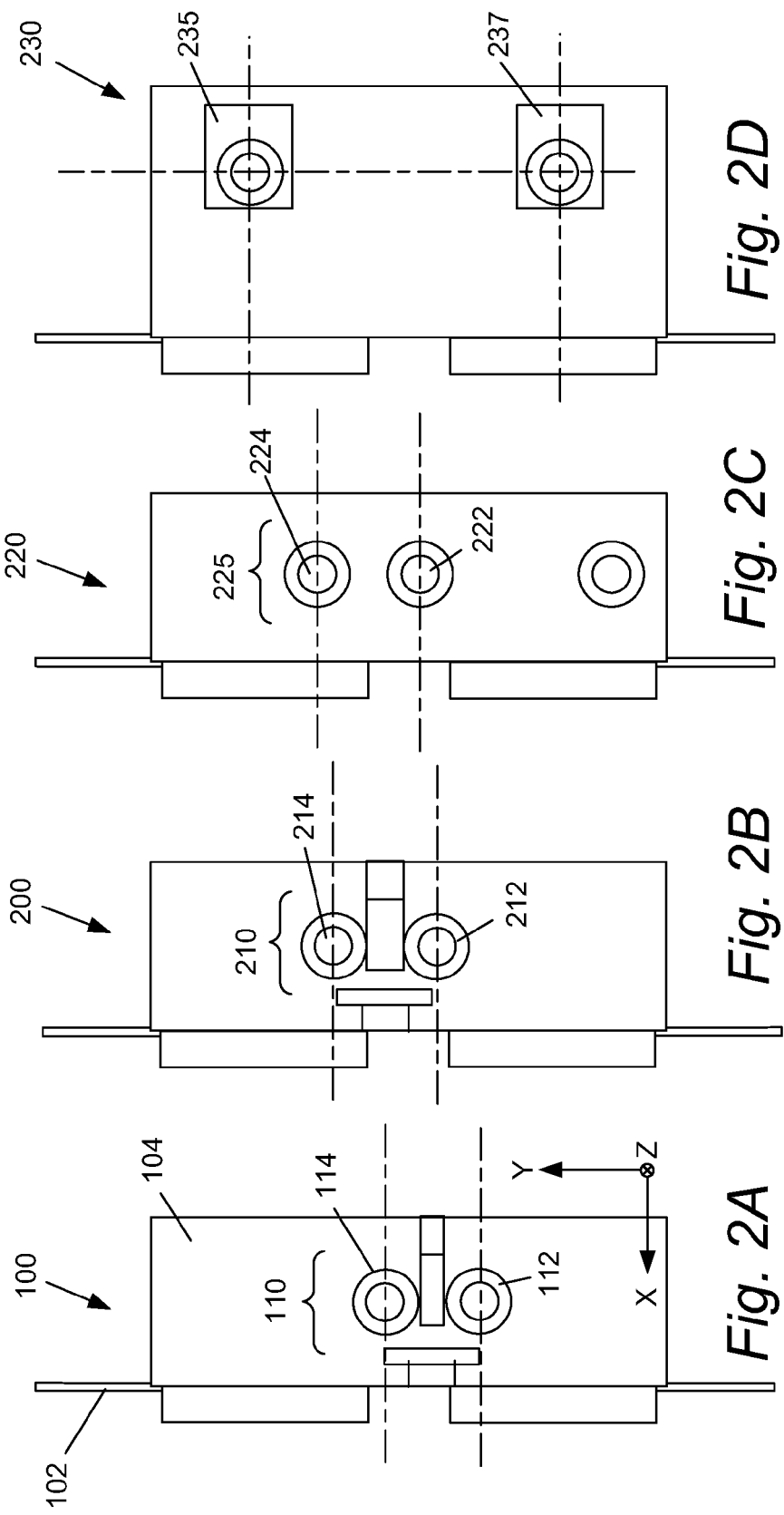

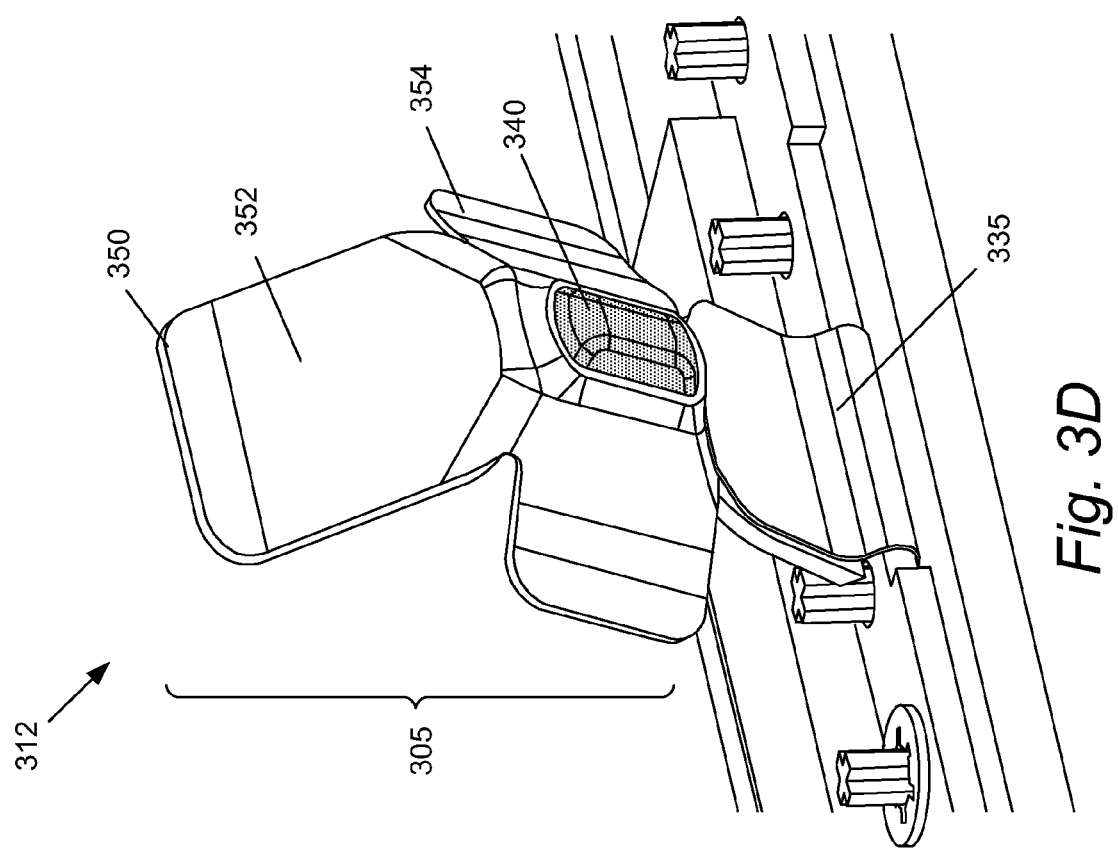

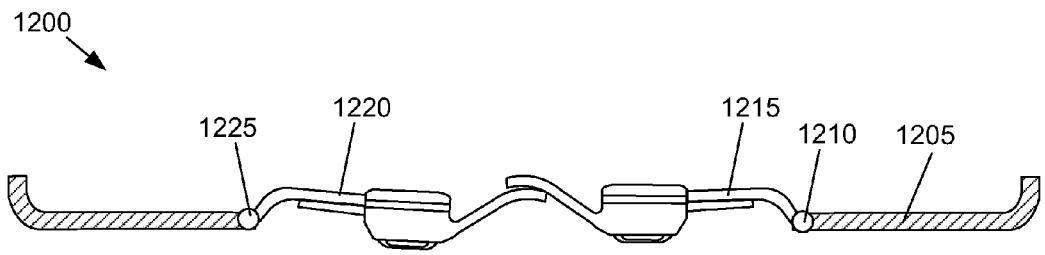
*Fig.12A*
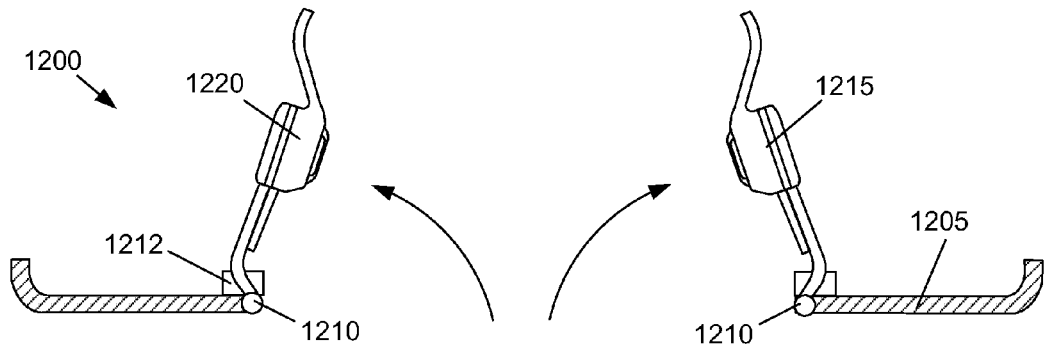
*Fig.12B*
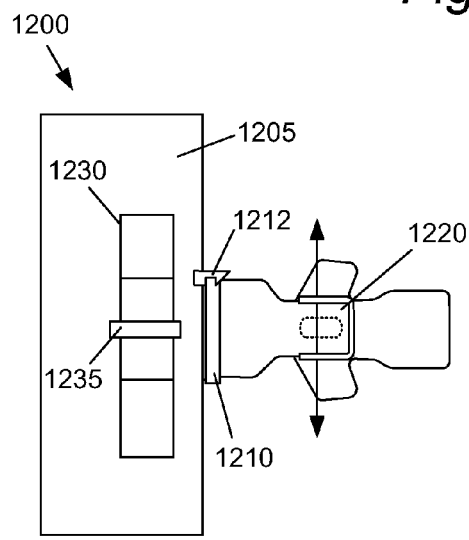 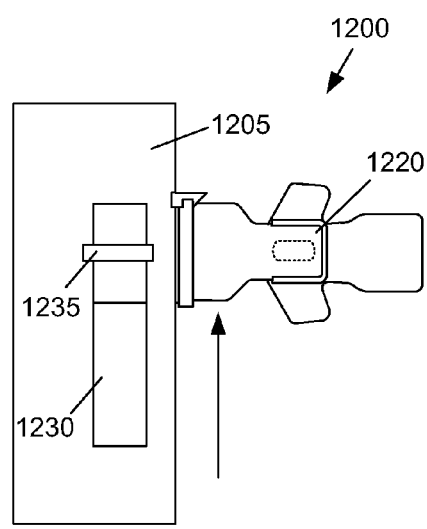
*Fig.12C*          *Fig.12D*

ACTIVE COVER PLATES

RELATED APPLICATIONS

The present application claims priority under 35 U.S.C. §119(e) to U.S. Provisional Application No. 61/720,131, filed Oct. 30, 2012; U.S. Provisional Application 61/778,386, filed Mar. 12, 2013; and U.S. Provisional Application 61/836,972, filed Jun. 19, 2013, which applications are incorporated by reference in their entireties. The present application is a continuation-in-part, and claims the benefit under 35 U.S.C. §120, of U.S. application Ser. No. 13/461,915, filed May 2, 2012, now U.S. Pat. No. 8,912,442 which claims the benefit under 35 U.S.C. §119(e) of U.S. Provisional Application No. 61/574,344, filed Aug. 1, 2011. These applications are hereby incorporated by reference in their entireties.

BACKGROUND

Modern buildings include wiring to deliver electrical power to lights, outlets, and other devices. The electrical wiring terminates in an electrical box in a wall, ceiling, floor or connected to another structural element. Connections are made to the wiring in the electrical box. For example, electrical wiring may be connected to outlet bodies by stab-in connectors or with screw terminals on the sides of the outlet body. After installation, a cover plate is placed over the outlet body to cover the opening to the box while allowing access to the outlet receptacles on the face of the outlet body. Similar connections are made when installing switches, which are also covered with a cover plate.

BRIEF DESCRIPTION OF THE DRAWINGS

The accompanying drawings illustrate various examples of the principles described herein and are a part of the specification. The illustrated examples are merely examples and do not limit the scope of the claims.

FIGS. 1A-1C are views of an outlet and an active cover plate that fits over the outlet body, according to one example of principles described herein.

FIGS. 2A-2D are side views of different outlet bodies to illustrate the variability in the placement of screw terminals on the sides of the outlet bodies, according to one example of principles described herein.

FIGS. 3A-3G show examples of an active cover plate with spring clips having an insulated ramp portion, according to one example of principles described herein.

FIGS. 12A-12D are diagrams of an active cover plate with hinged spring clips, according to one example of principles described herein.

Throughout the drawings, identical reference numbers designate similar, but not necessarily identical, elements.

DETAILED DESCRIPTION

Figure 3A:
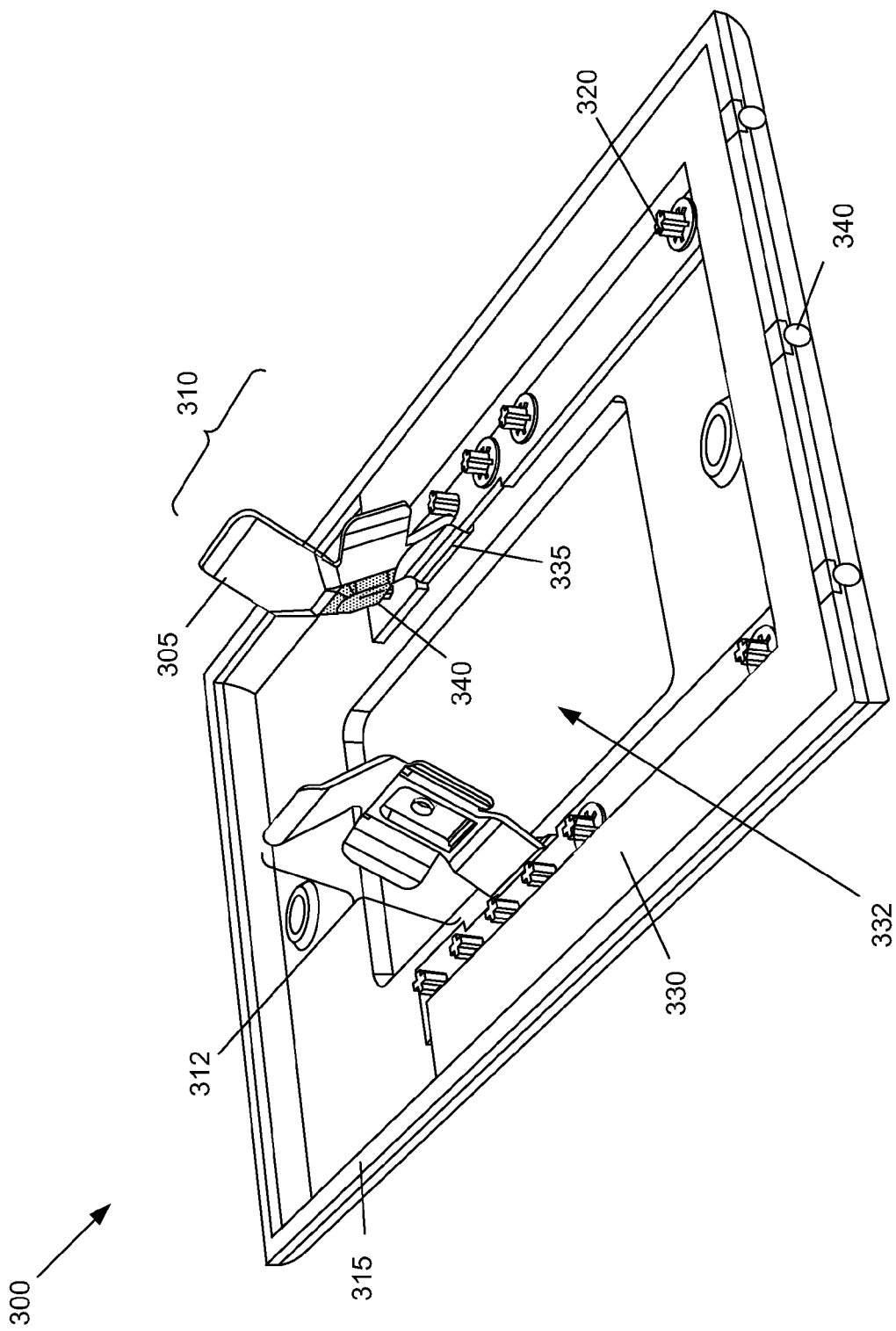

Reference will now be made to the figures wherein like structures will be provided with like reference designations. In the following description, for purposes of explanation, numerous specific details are set forth in order to provide a thorough understanding of the present systems and methods. It will be apparent, however, that systems and methods may be practiced without these specific details. It is understood that the figures are diagrammatic and schematic representations of some embodiments of the invention, and are not limiting of the present invention, nor are they necessarily drawn to scale. Reference in the specification to "an example" or similar language means that a particular feature, structure, or characteristic described in connection with the example is included in at least that one example, but not necessarily in other examples.

Additionally, features shown and/or described in connection with one figure may be combined with features shown and/or described in connection with other figures. As used in the present specification and in the appended claims, the term "a number of" or similar language is meant to be understood broadly as any positive number comprising 1 to infinity; zero not being a number, but the absence of a number.

FIGS. 1A, 1B and 1C illustrate an outlet body (100) and connection of an active cover plate (150) to the outlet body. In this example, the outlet body (100) is a duplex style National Electrical Manufacturers Association (NEMA) outlet body. The outlet body (100) includes two outlet receptacles (115). Each outlet receptacle (115) includes two power receptacles (120) and a ground (125).

On either side of the outlet body (100) are screw terminals (105, 110). The building wiring may be connected to the screw terminals by wrapping a stripped end of the house wiring around the screw and then tightening the screw to sandwich the wire between the bottom of the screw and a conductive plate. There may be a first screw terminal on a first side of the outlet body that is connected to a neutral building wire and a second screw terminal on the same or an opposite side of the outlet body that is connected to a hot building wire. For example, the left terminal (105) may be connected to the neutral building wire and the right terminal (110) may be connected to the hot building wire. The screw terminals make internal connections to contacts in the outlet body (100). When an electrical cord is plugged into the outlet receptacle (115), the blades of the electrical cord enter the power receptacles (120) and make an electrical connection with the contacts. This allows current from the building wiring to pass through the outlet body (100) and into the cord. The outlet body (100) also includes two brackets (135) to connect it to an electrical box.

FIG. 1B shows a side view of the outlet body (100) showing the screw terminal (110). The screw terminal (110) in this example includes conductive backing plates (140, 142) and two screws (112, 114) that thread into the backing plates (140, 142). The backing plates (140, 142) are electrically and mechanically joined by a break off tab (145). The break off tab (145) can be removed to electrically isolate the first screw (112) and its backing plate (142) from the second screw (114) and its backing plate (140).

FIG. 1C shows an active cover plate (150) that is mounted over the outlet body (100). The active cover plate (150) includes a face plate (155) and two spring clips (160) extending rearward from the face plate. In this view only one spring clip is visible, the other spring clip is directly opposite (see FIG. 3A for a perspective view showing both spring clips). Each spring clip includes an electrical contact (165). When the active cover plate (150) is placed over the outlet (100), the two spring clips bring the electrical contacts (165) into contact with the screw terminals (110) on either side of the outlet body (100). Ordinarily, the electrical contacts (165) make contact with the heads of the screws (112, 114) because the heads of the screws (112, 114) extend away from the outlet body (100) the farthest. The screw terminals (110) are connected to the building wiring (170, 175). This allows the active cover plate (150) to extract electrical power from the outlet body (100) through the spring clips (160).

Spring clips that extract electrical power from an outlet body or other receptacle body to power an active cover plate may have a number of advantages, including reliability and simplicity. However, the screw terminals may have a variety of positions on the side of the outlets. The location of the screw terminals varies according to the type of outlet body and the manufacturer. While dimensions on the face of the outlet body are generally consistent, the variance in the location of the screw terminals on the sides of the outlet body can produce a significant challenge in creating an active cover plate that fits most or all of the outlets present on the market and/or installed in buildings.

An outlet body is only one example of an electrical device that an active cover plate could interface with. Other examples include switch bodies and electrical boxes with connections for lights, fire alarms, CATS cable connections, phone jacks, or other installations over or in electrical boxes. In general, a body that a cover plate of any type fits over is referred to as the "receptacle body."

FIGS. 2A-2D show four different examples of outlet bodies (100, 200, 220, 230) that illustrate the differences in placement of the screw terminals on the sides of the outlet bodies. FIGS. 2A, 2B, and 2C show side views of duplex style outlet bodies (100, 200, 220). The screw terminals show a significant amount of variability between these three outlet bodies (100, 200, 220). The outlet body (100, FIG. 2A) on the left has a screw terminal (110) with two screws (112, 114). The screws (112, 114) are located slightly more than halfway down the outlet body (100). These screws (112, 114) are closer together than any of the other screws shown in FIGS. 2B, 2C, and 2D. An XYZ axis is shown on the lower right of the outlet body (100) in FIG. 2A. The screws may have varying location in any of the X, Y, and Z directions. Variations in the Y direction are called vertical variations and are in the plane of the face (102) of the outlet body. Variations in the X direction are called horizontal or depth variations and are in the plane of the side (104) of the outlet body. FIGS. 2A-2D show both vertical and depth variations in the locations of the screws. Variations in the Z direction (into and out of the page and across the face of the outlet body) are called width variations. Width variations can occur for a variety of reasons. For example, the outlet bodies may have different widths or screws may be screwed out or in on the sides of the outlet bodies. The flexibility of the spring clips can typically accommodate a significant amount of variation in width. However, variations in the horizontal and vertical directions can be challenging to accommodate.

The outlet body (200) in FIG. 2B has a screw terminal (210) that is located more than halfway up the side. The heads of the screws (212, 214) are spaced farther apart than the screw terminals in the outlet body (100) to the left. FIG. 2C shows an outlet body (220) with a screw terminal (225) that is located even higher up the side of the outlet body (220). The screws (222, 224) have the same spacing as the outlet body in FIG. 2B. FIG. 2D is a side view of a ground fault circuit interrupter (GFCI) outlet body (230). The screw terminals (235, 237) in this outlet body (230) are placed farther apart and significantly farther back from the face of the outlet. The examples shown in FIGS. 2A-2D are only examples. The screws and screw terminals can be located in a variety of positions on various receptacle bodies. For example, the screw terminals on switch bodies can be in different locations than on outlet bodies.

Thus, there can be a significant amount of variability in the location of the screw terminals in outlet bodies that are in use and/or on sale. Where the screw terminals are not symmetrical about the centerline, the screws will be at a different location with respect to the electrical box and cover plate depending on the orientation of the outlet body. For example, if the outlet body were installed right side up, the screw terminals would be at a first vertical height and if the outlet body were installed upside down the screw terminals would be at a different vertical height. Additionally, if the receptacle body is a switch outlet body, one of the outlet receptacles may be connected to a switch. When the switch is off there is no power to the outlet receptacle. Consequently, it will be desirable for an active cover plate to be adjustable so that it extracts electrical power from screw terminals associated with the other outlet receptacle.

Creating an active cover plate that has the capability to reliably connect to a wide range of outlet bodies can be a significant challenge. An additional complication is that the screws in the screw terminal may be screwed out or in. This can significantly change the width that the prongs of the active cover plate have to open. As discussed above, there are at least three different types of adjustability that could be desirable in active cover plate prongs: vertical adjustability (in the Y direction) to accommodate screw terminals that are at different heights on the outlet body, horizontal adjustability (in the X direction) to accommodate screw terminals that are at different depths from the face of the outlet body, and width adjustability (in the Z direction) to accommodate outlet bodies that have varying widths and to accommodate variable insertion depths of screws in the screw terminals.

FIGS. 3A-3F show one example of active cover plate (300) with spring clips (310, 312) that are adjustable vertically and in width. FIG. 3A is a rear perspective view of the active cover plate (300) for a "decora" style outlet body. The active cover plate (300) includes a face plate (315) with an aperture (332) through which the outlet receptacles in the outlet body are accessible. The active cover plate (300) also includes spring clips (310, 312) and a sandwich plate (330). The spring clips (310, 312) include a compliant conductive portion (335) with one end that is sandwiched between the face plate (315) and the sandwich plate (330). In this example, a rectangular rivet (340) and a non-conductive portion (305) are connected to an opposite terminal end of the compliant conductive portion (335). The spring clips (310, 312) and sandwich plate (330)

could be fastened to the faceplate (315) using a number of techniques, including heat staking or using fasteners that are pressed over the posts (320). When placed over an outlet body, the rivets (340) on the spring clips (310, 312) contact the electrified screw terminals on the sides of the outlet body to extract power from the building wiring/outlet body. Although this active cover plate (300) is only illustrated with two opposing spring clips (310, 312), an active cover plate may have any number of spring clips.

Figure 3C:
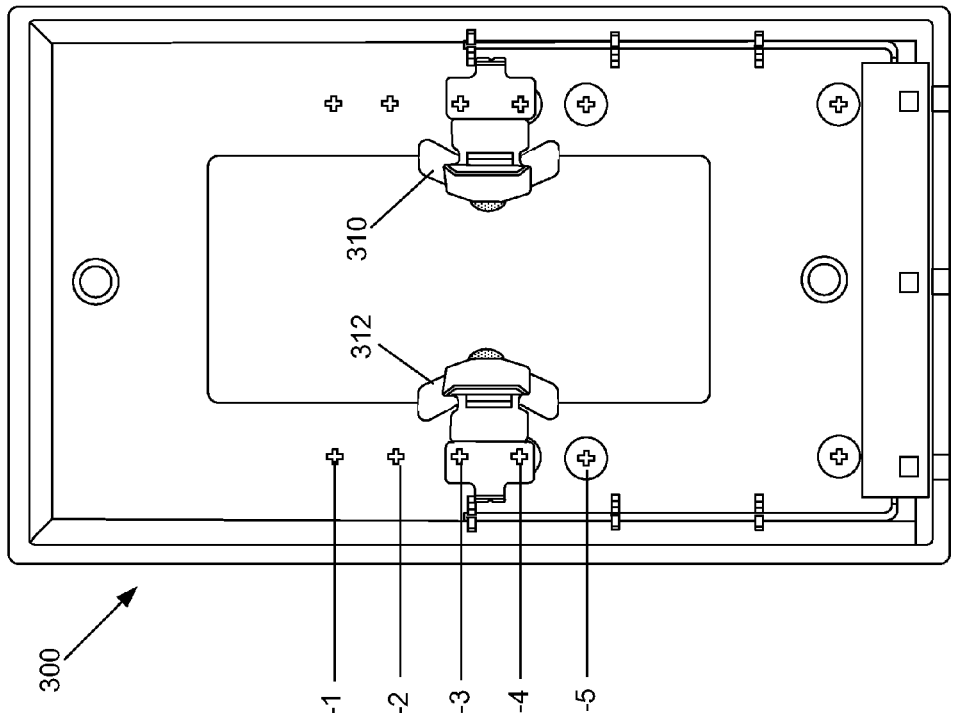
Figure 3B:
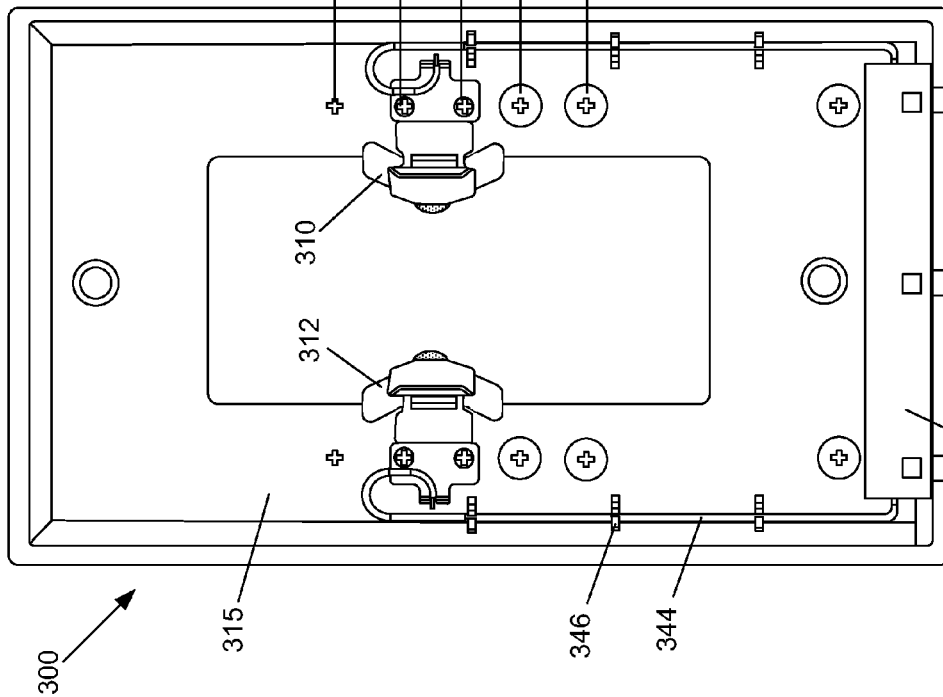

FIGS. 3B and 3C are rear views of the active cover plate (300) with the spring clips (310, 312) in different vertical locations. For purposes of illustration the sandwich plate (330, FIG. 3A) has been removed to show the interior components. Wires (344) connected to the spring clips (310, 312) are routed through the wire brackets (346) to a load. The load can include any electrical device that requires power. For example, the load can include an electrical device embedded within the active cover plate (300). For example, the load can include lights, motion detectors, photocells, wireless nodes, blue tooth connectors, smoke detectors, carbon monoxide detectors, cameras, heat detectors, speakers, microphones or any other desired electrical device. In this example, the load is a circuit board (342) that includes three light emitting diodes (LED) that shine downward and out of the face plate. An LED is a semiconductor light source. LEDs can produce high intensity light with less power than conventional light sources. In particular, LEDs convert a higher percentage of input power to light and a lower percentage to heat or other waste.

The face plate (315) includes a number of molded posts (348-1, 348-2, 348-3, 348-4 and 348-5) that extend rearward. The vertical location of the spring clips (310, 312) can be adjusted by selecting which of the posts the spring clips are placed over. In the configuration shown in FIG. 3B the spring clips are mounted to the second post (348-2) and the third post (348-3). This position allows the active cover plate (300) to make secure electrical connections with an outlet body in a first configuration (for example, an outlet body that is installed right side up).

In the second configuration shown in FIG. 3C, the active cover plate (300) has both of the spring clips (310, 312) in a lower vertical position, with the spring clips (310, 312) mounted on the third post (348-3) and fourth post (348-4). This position allows the active cover plate (300) to make secure electrical connections with an outlet body in a second configuration (for example, an outlet body that is installed upside down). Alternatively, the spring clips' vertical positions could be adjusted to accommodate different designs of outlet bodies. The other posts, the first (348-1) and fifth posts (348-5) may be used to connect the sandwich plate (330, FIG. 3A) to the face plate (315) and/or for further adjustability of the spring clips.

Figure 3F:
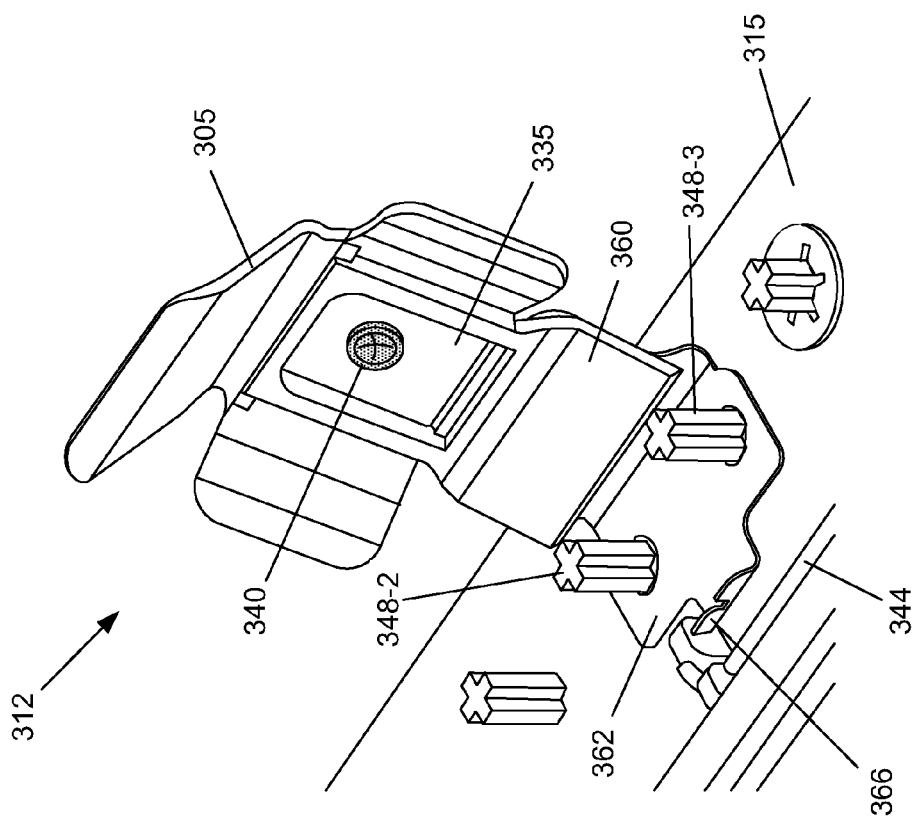
Figure 3E:
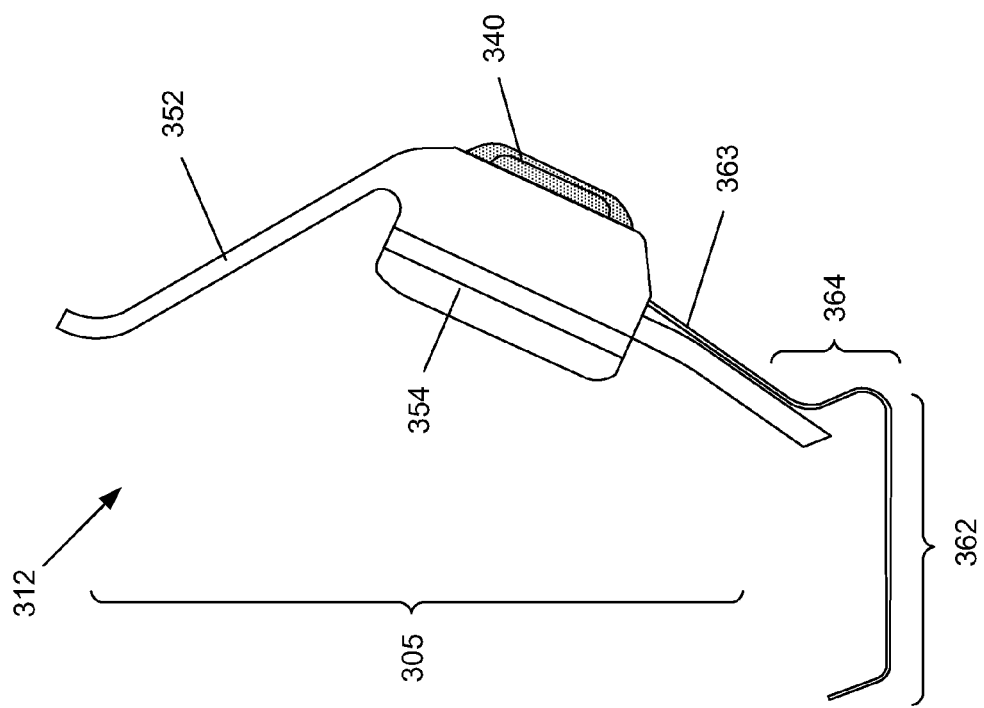

FIGS. 3D-3G are additional views of a spring clip (312) that could be used in conjunction with the cover plate shown in FIGS. 3A and 3B. FIGS. 3D, 3E, and 3F are front, side and rear perspective views of an illustrative spring clip, respectively. FIG. 3D shows a front perspective view of a spring clip (312) that includes a conductive portion (335) and a non-conductive portion (305). The non-conductive portion (305) has a main ramp (352), side wings (354), and terminal curve (350). The non-conductive portion (305) may have a variety of purposes including preventing the conductive portion (335) from undesirably contacting wires, the electrical box, or other materials. The non-conductive portion (305) may also prevent arcing between resilient conductors and external conductors.

The non-conductive portion (305) of the spring clip (312) can be formed from a variety of insulating materials, including polymers, ceramic, composite materials, or other material. In this example, the non-conductive portion is formed from a flexible resilient polymer material such as nylon. The non-conductive portion (305) can be formed in a variety of ways, including injection molding.

The non-conductive portion (305) is attached to the terminal end of the conductive portion (335) by the rivet (340). Additionally or alternatively, a number of other techniques can be used to attach the non-conductive portion (305) to the conductive portion (335). For example, the non-conductive portion (305) may be joined to the conductive portion (335) by adhesive, heat welding, press fit, snap fit, induction welding (for specific types of materials), ultrasonic welding/staking, and other suitable techniques. These techniques can be used separately or in combination. For example, the rivet joint may be supplemented by with molded features on the non-conductive portion. As discussed above, the riveted connection between the non-conductive portion and conductive portion has a number of advantages, including using the head of the rivet (340) as a contact point and the swaging of the rivet (340) into/over a hole in the conductive portion (335) to ensure that there is a reliable electrical connection between the rivet (340) and the conductive portion (335).

The non-conductive portion (305) can serve a variety of functions. As discussed above, the non-conductive portion (305) includes an angled end portion or a main ramp (352), a terminal curve (350) and two side wings (354) that extend to either side of the central portion of the spring clip (312). The non-conductive portion (305) serves as a guide that directs the active cover plate into accurate positioning over an outlet/switch body. Where there are opposing spring clips, the angled ramp (352) guides and centers the active cover plate (300, FIG. 3A) over the outlet/switch body. In situations where an active cover plate (300, FIG. 3A) is misaligned or has less clearance, the non-conductive portion (305) may contact the wall of an electrical box. The terminal curve (350) ensures that the spring clip (312) glides smoothly along the wall. The spring force of the conductive portion (335) and ramp geometry of the non-conductive portion (305) gently guides the active cover plate (300, FIG. 3A) into place with increasing accuracy as the active cover plate (300, FIG. 3A) is pushed closer to its final position.

The non-conductive portion (305) is contoured so that the electrical contact (the head of the rivet (340)) does not have any exposed edges that may snag on the outlet body, wires, or screws. The side wings (354) allow for the spring clip (312) to glide up and down over the screws and screw terminals. There may be vertical misalignment between the active cover plate and the receptacle body/screw terminals during the installation process. To achieve the desired alignment, and to allow the active cover plate to fit around the face of the receptacle body and to align the fastener aperture in the cover plate with the threaded hole in the outlet body, the active cover plate may be slid up and down with respect to the receptacle body. For example, a user may have engaged the active cover plate too low on the receptacle body and needs to move it up to align the cover plate with the outlet body. The side wings (354) and smooth contours of the spring clip (312) created by molding the central portion of the non-conductive portion (305) to match/mate with the surface of the installed rivet (340) allow the spring clip to glide smoothly over the screws. The side wings (354) progressively bend the spring clip (312) backwards to lift it over obstacles (such as screw heads and contours of the receptacle body).

In this example, the head of the rivet (340) is rectangular, with the major axis of the rectangular head oriented to provide contact with screw terminals/screws that have a variety of depths (distances from the front face of the outlet body). The narrow width of the rivet head reduces the likelihood of arcing if the screw terminal has been divided into two separate electrical elements by removing the break-out in the middle of the screw terminal. This geometry is only one example. A variety of other electrical contact geometries could be used. Additionally, the flexible conductive portion is angled inward to present the rivet head at a desired angle and to provide for a large range of motion of the spring clip outward. This accommodates receptacle bodies of varying width and screws that are screwed outward from the screw terminals.

FIG. 3E is a side view of the spring clip (312) that shows various components of the flexible conductive portion (335). In this example, the flexible conductive portion (335) includes a base portion (362, an "S" shaped curve connected to the base portion, and an angled portion (363). The angled portion (336) directs the rivet (340) inward toward the outlet body. The rivet (340) is the most prominent portion of the spring clip and extends farthest inward toward the outlet/receptacle body. Both the side wings (354) and the main ramp (352) are angled away from the outlet body, with the base of the side wings and ramp joining with the center of the non-conductive portion (305) containing the rivet (340) and the ends of the side wings (354) and ramp (352) extending away from the outlet body.

The flexible conductive portion (335) may include a variety of compound curves that increase its flexibility and resilience in allowing the motion/travel of the spring clip toward and way from the outlet/switch body (width adjustment). One example of this is the "S" shaped curve (364). The "S" shaped curve serves several functions. The "S" shaped curve provides increased flexibility to the spring clip by providing two separate curvatures that bend. The "S" shaped curve also allows for more bending/travel of the spring clip before the permanent deformation of the conductive portion because the bending is distributed over two locations rather than one.

FIG. 3F shows a rear view of the spring clip (312). The end of the conductive portion (335) has a reduced width and interfaces with the non-conductive portion (305). The center of the conductive portion (335) with reduced width has an aperture through which the rear of the rivet (340) passes. The rear of the rivet (340) is then swaged (mushroomed) over the aperture as shown in FIG. 3F to make the connection between the flexible conductive portion (335) and the non-conductive portion (305). In this example, the nonconductive portion (305) also includes a skirt (360) that covers the rear of the conductive portion and prevents undesirable electrical contact and arcing.

The width of the conductive portion may create a significant resistance to twisting or bending forces that would tend to undesirably move the spring clip back and forth toward the top/bottom of the active cover plate. This undesired motion tends to occur when the active cover plate is being moved vertically with respect to the outlet/switch body and the spring clip is moving over the screws/screw terminals. The relatively high stiffness of the spring clip in this direction prevents twisting/deformation during this operation, while the much lower stiffness of the spring clip in the perpendicular direction (motion toward and away from the screw terminals) allows for the spring clip to move smoothly over the screws/screw terminals.

FIG. 3F also shows how the spring clip (312) is secured to the face plate (315) and makes an electrical connection with the wire. The spring clip (312) includes a base portion (362) with a number of apertures. The apertures are configured to receive various alignment and anchor features that are molded into the face plate (315). As discussed above, there are number of equally spaced press nut posts (348) in the face plate (315). The apertures in the base portion (362) are configured to accept any two adjacent posts (348). In this example, the spring clip (312) has been placed over the second and third posts (348-2, 348-3). By selecting which posts (348) the apertures are placed over, the vertical position of the spring clip (312) can be selected during manufacturing without having to manufacture different face plates (315), spring clips (312) or sandwich plates. The connection between the wire (344) and the spring clip (312) is made using a wire attach feature (366) on the base portion (362). The wire attach feature may include a slot into which a stripped conductor can be placed. The conductor can then be soldered to the wire attach feature. The wire (344) can be cut to the desired length or can be long enough to accommodate all vertical positions of the spring clips (312).

Figure 3G:
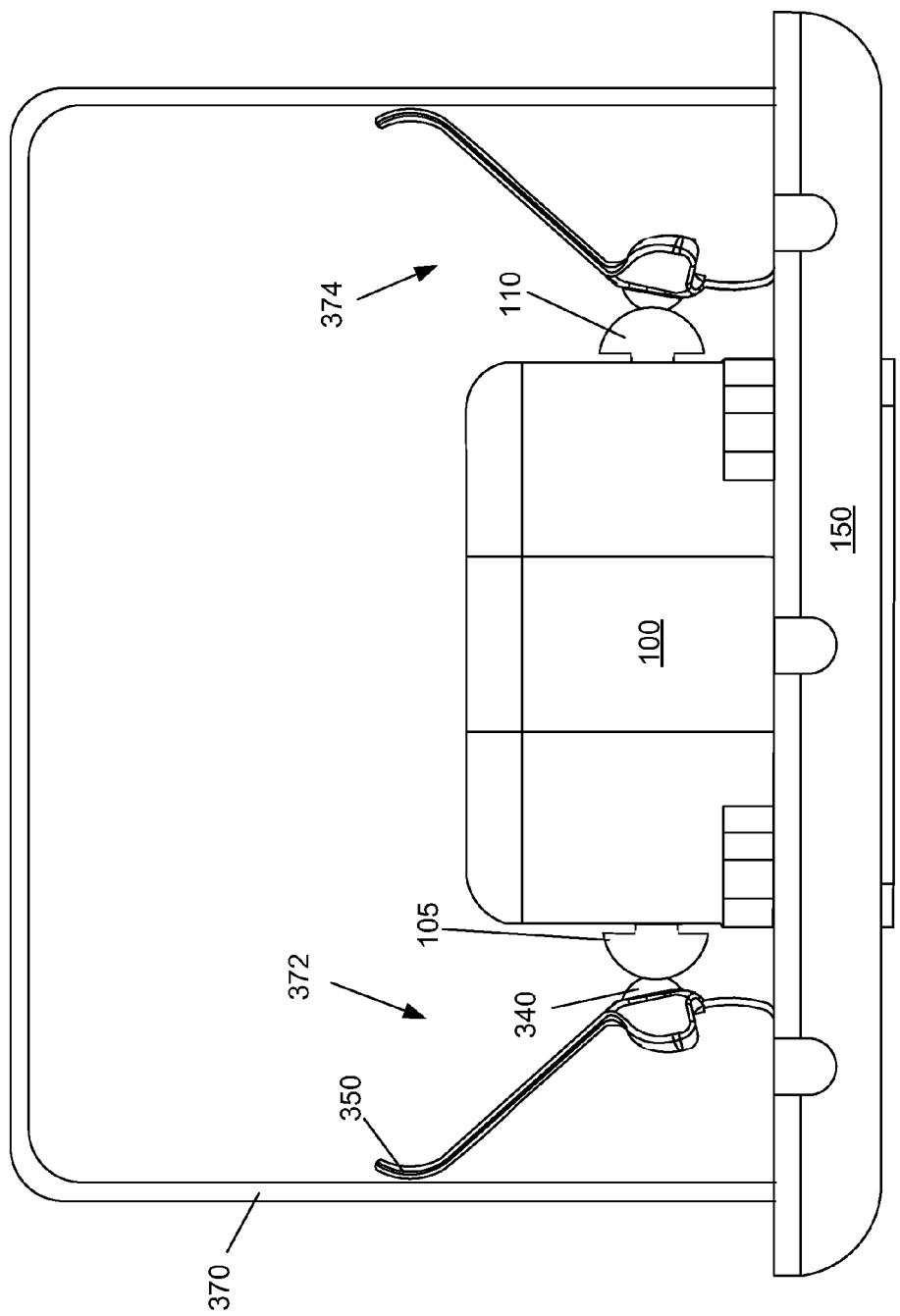

FIG. 3G is an end view of an active cover plate (150) that is fastened over an outlet body (100) installed in an electrical box (370). A left spring clip (372) makes electrical contact with a left hot screw terminal (105) and a right spring clip (374) makes electrical contact with a right neutral screw terminal (110). In this example, the terminal curves (350) of the insulating main ramps (352, FIG. 3D) contact the inside walls of the electrical box (370). This occurs when the spring clips (372, 374) are bent outward. The terminal curves (350) allow the spring clips (372, 374) to slide along the wall and also provide additional support to the spring clips (372, 374) to prevent over bending and plastic deformation of the flexible conductive portion (335, FIG. 3D) of the spring clips.

The illustrations in FIG. 3A-3G show various examples of spring clips that can be adjusted during assembly of the active cover plate. This allows for multiple types of active cover plates to be constructed with common parts.

FIGS. 4A-4D show an example of an active cover plate that can be adjusted either during or after assembly of the active cover plate. In one example, the spring clips can be adjusted after the active cover plate is completely assembled. The screw terminals on outlet and switch bodies may be formed in a variety of locations. To accommodate the widest number of outlets, the active cover plate may include multiple position spring clips. The spring clips may be moved vertically to reposition the spring clips to more effectively contact the screw terminals.

Figure 4A:
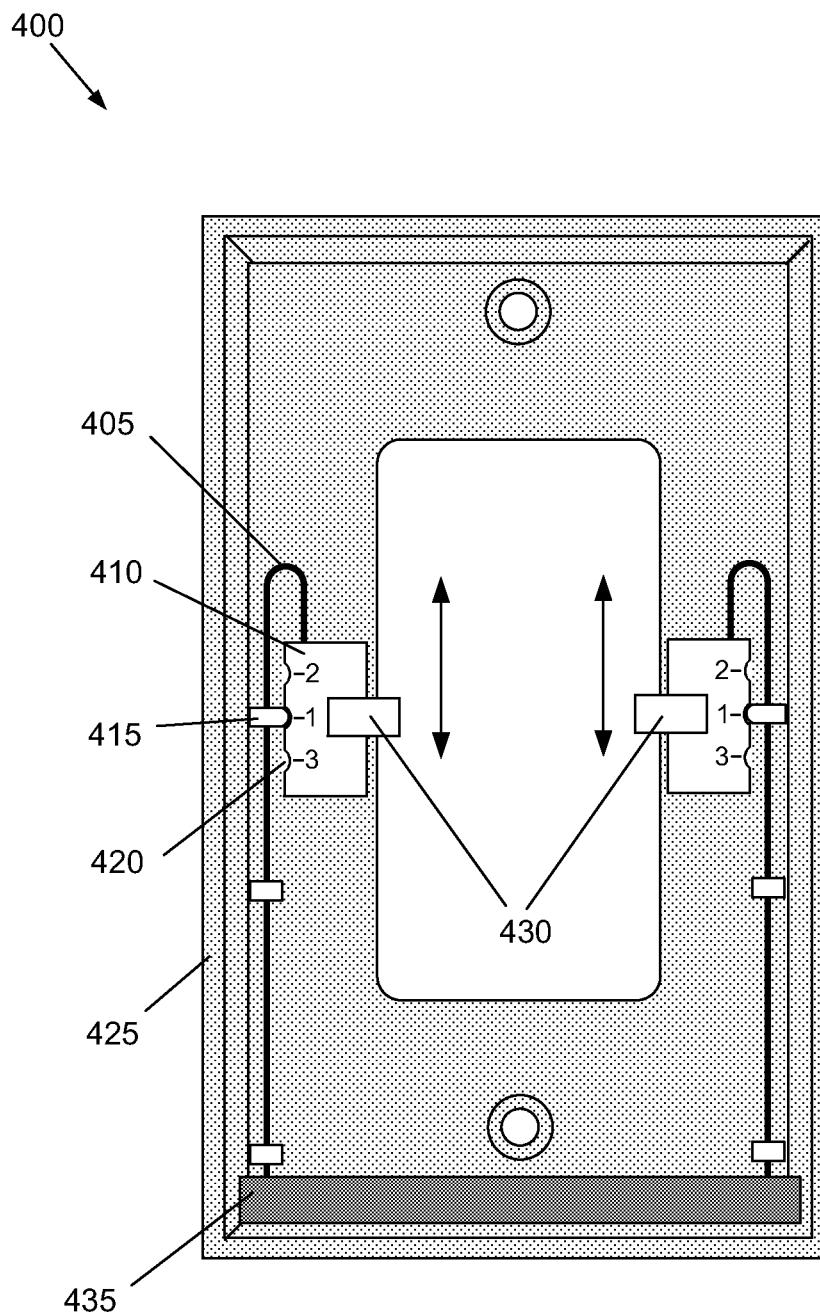
FIGS. 4A-4D are diagrams of an active cover plate with adjustable spring clips, according to one example of principles described herein.

FIG. 4A is a rear view of a universal active cover plate (400) with multiple position spring clips (430) that slide vertically or have multiple vertical positions to better connect to outlet/receptacle bodies with different orientations or different screw terminal placement. For example, outlet bodies that are installed right side up (ground prongs on the bottom) or upside down (ground prongs on the top) may have screws in different vertical positions. By allowing the multiple position spring clips (430) to be vertically adjusted with respect to the face plate (425), a single face plate design can accommodate both upside down and right side up outlet body installations as well as receptacle bodies with different screw terminal locations.

In FIG. 4A, the multiple position spring clips (430) include a sliding base (410) with numbered notches (420) along one side. A detent (415) engages with the notches (420) to secure the sliding base in the desired position. In this example, there are three positions for the sliding base. The multiple position spring clips (430) are connected to the sliding bases (410) and move with the bases (410). The sliding base (410) may move in a track that is molded into the face plate (425). The motion of the sliding base is in the plane of the face plate (425) and is illustrated by the double headed arrows. The spring clips can be individually adjusted to different locations if desired.

A flexible conductor (405) connects the multiple position spring clip (430) to the circuit board (435). The flexible conductor (405) has slack to accommodate motion of the sliding base (410). For example, the flexible conductor (405) may be stranded wire or a laminated ribbon cable.

Figure 4D:
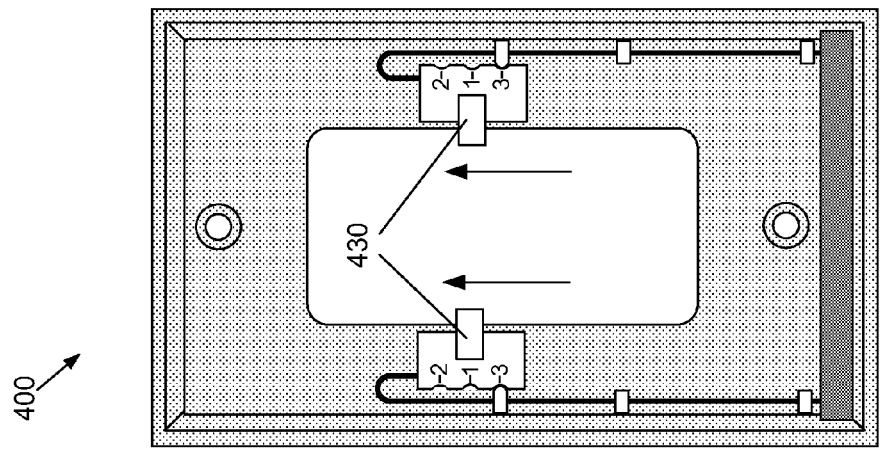
Figure 4C:
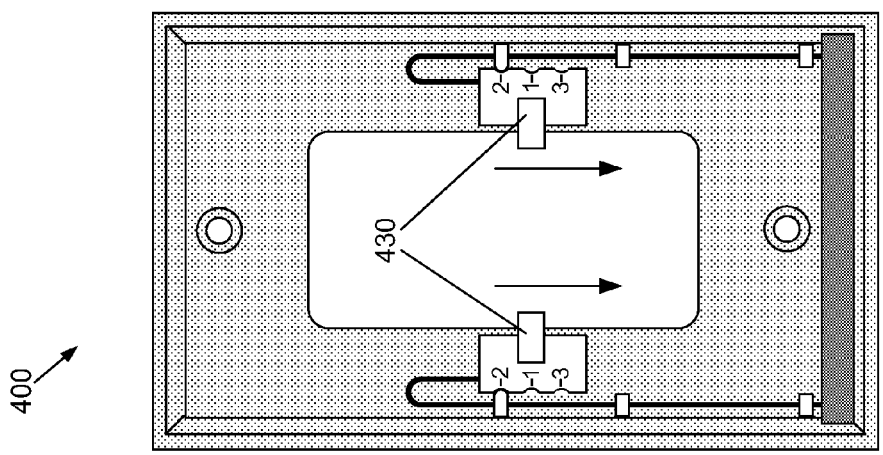
Figure 4B:
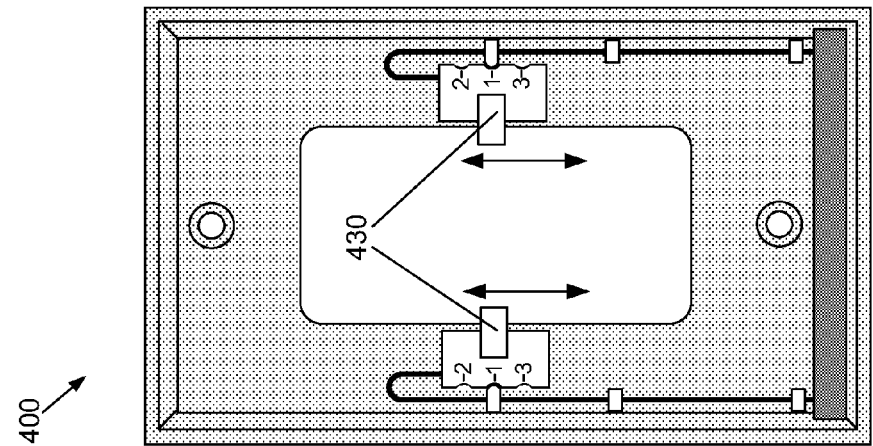

FIGS. 4B, 4C and 4D show the multiple position spring clips (430) in various positions on the face plate (400). The multiple position spring clips (430) may be moved by applying manual pressure to the sliding base (410, FIG. 4A) so that the detent (415, FIG. 4A) slides out of a first notch and into a second notch. FIG. 4B shows the multiple position spring clips (430) in a nominal position ("position 1") that allows the multiple position spring clips (430) to contact the screw terminals on the majority of outlets. From position 1, the spring clips can be adjusted either up or down as shown by the double headed arrows. FIG. 4C shows the spring clips (430) pushed down into position 2. The multiple position spring clips (430) may be moved together or separately, depending on the situation. FIG. 4D shows the spring clips (430) moved up to position 3. The combination of positions 1, 2, and 3 are designed to allow the spring clips to make electrical contact with a majority screw terminals in a particular class of receptacle bodies. As shown below, the spring clips could also have adjustable depths to reach screw terminals that are deeper or shallower in the receptacle box.

Figure 5B:
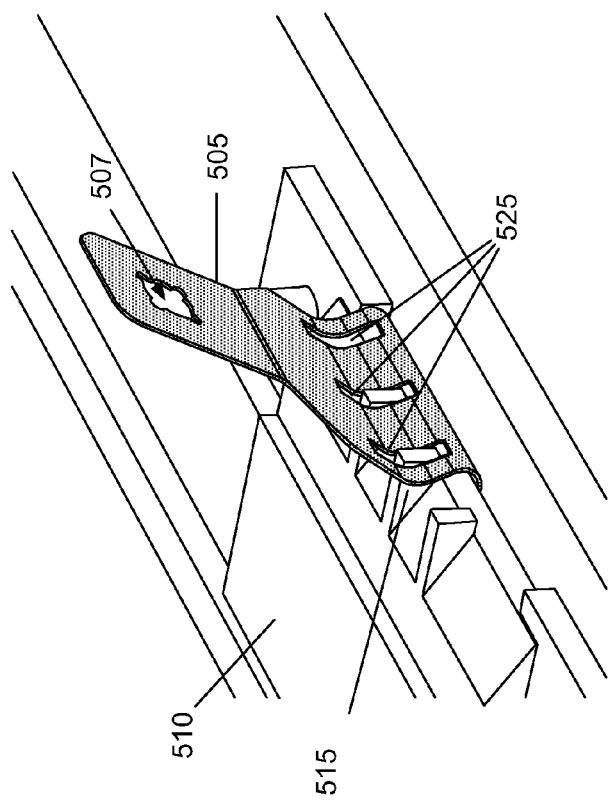
FIGS. 5A-5D show various structures for adjusting the vertical position of prongs on an active cover plate, according to one example of principles described herein.
Figure 5A:
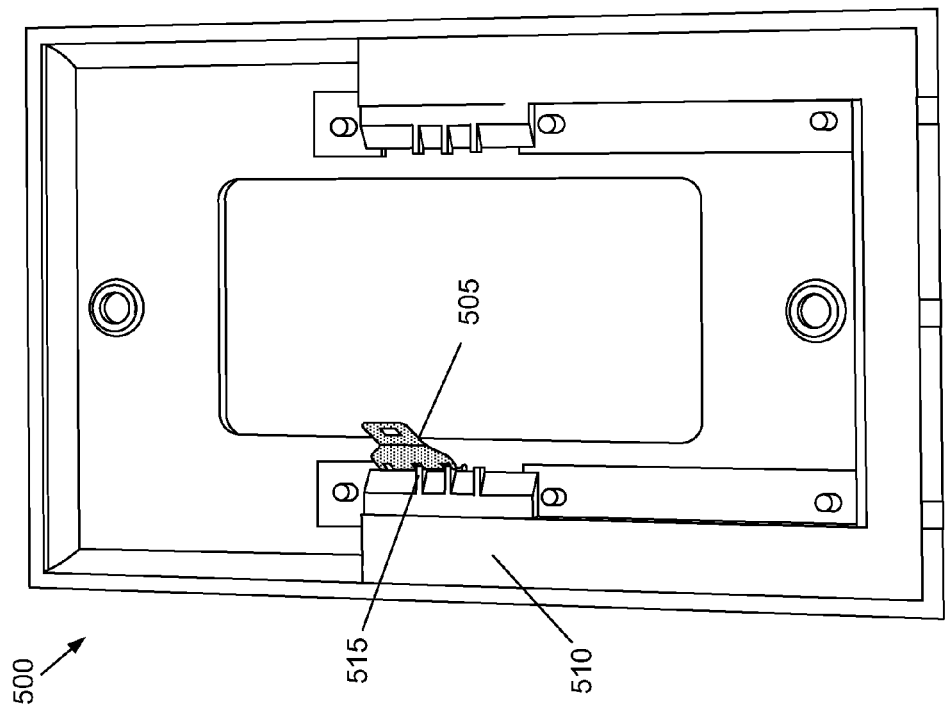

FIGS. 5A and 5B show one example of an active cover plate (500) that includes a spring clip (505) that can be adjusted to have multiple vertical positions. In this example, the protrusions (515) on the sandwich plate (510) engage with slots (525, FIG. 5B) in the spring clip (505). In this example, the spring clip (505) is shown without the nonconductive portion and rivet. The hole (507) through the conductive portion is shown. The nonconductive portion is placed over the narrow end of the conductive portion and the rivet is placed through a hole in the nonconductive portion and through the hole (507) in the conductive portion. The rivet is then swaged in place. This fastens the nonconductive portion to the conductive portion and makes an electrical connection between the rivet and the conductive portion.

The engagement between the slots (525) in the spring clip (505) and the protrusions (515) on the sandwich plate (510) allow for the spring clip (505) to have multiple positions. The spring clip (505) can be moved during manufacturing of the active cover plate (500) or, in some examples, as part of the installation process. In FIGS. 5A and 5B, the spring clip has three slots and there are three protrusions on the face plate, but in general there may be any number of slots and protrusions to provide the desired amount of adjustment.

Figure 5D:
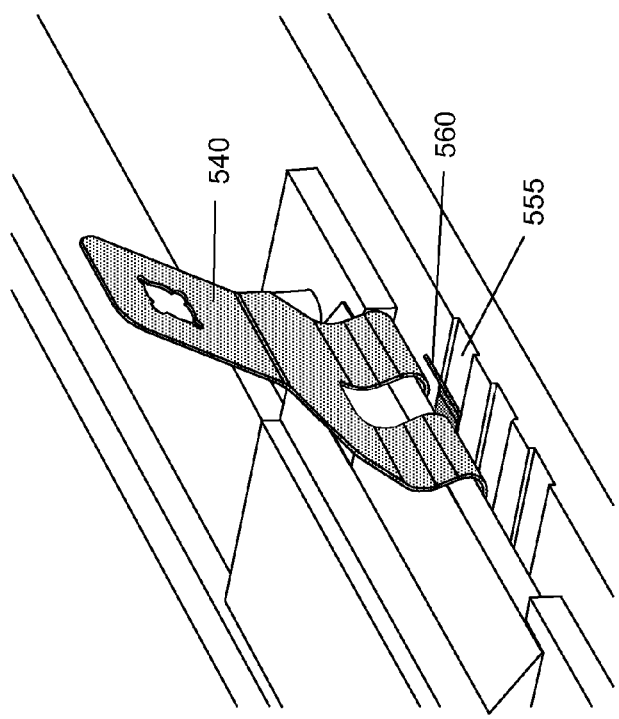
Figure 5C:
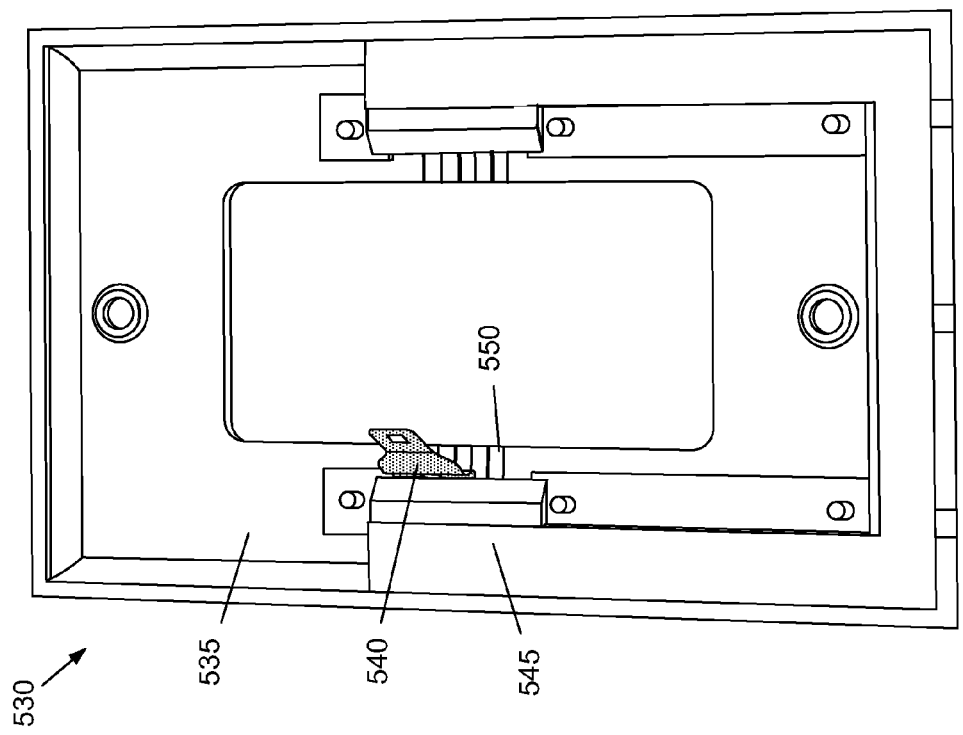

FIGS. 5C and 5D show a partially assembled active cover plate (530) that includes a spring clip (540) with a tab (560) that engages with one of three grooves (555) formed in the faceplate (535). This allows the spring clip (540) to be positioned in any of three different vertical locations. The tab (560) can be lifted and the adjustable spring clip (540) can slide back and forth between the sandwich plate (545) and the face plate (535). When the desired location is reached the tab (560) can be released to engage with the desired groove (550) and secure the spring clip (540) in place.

Figures 6A, 6B, 6C:
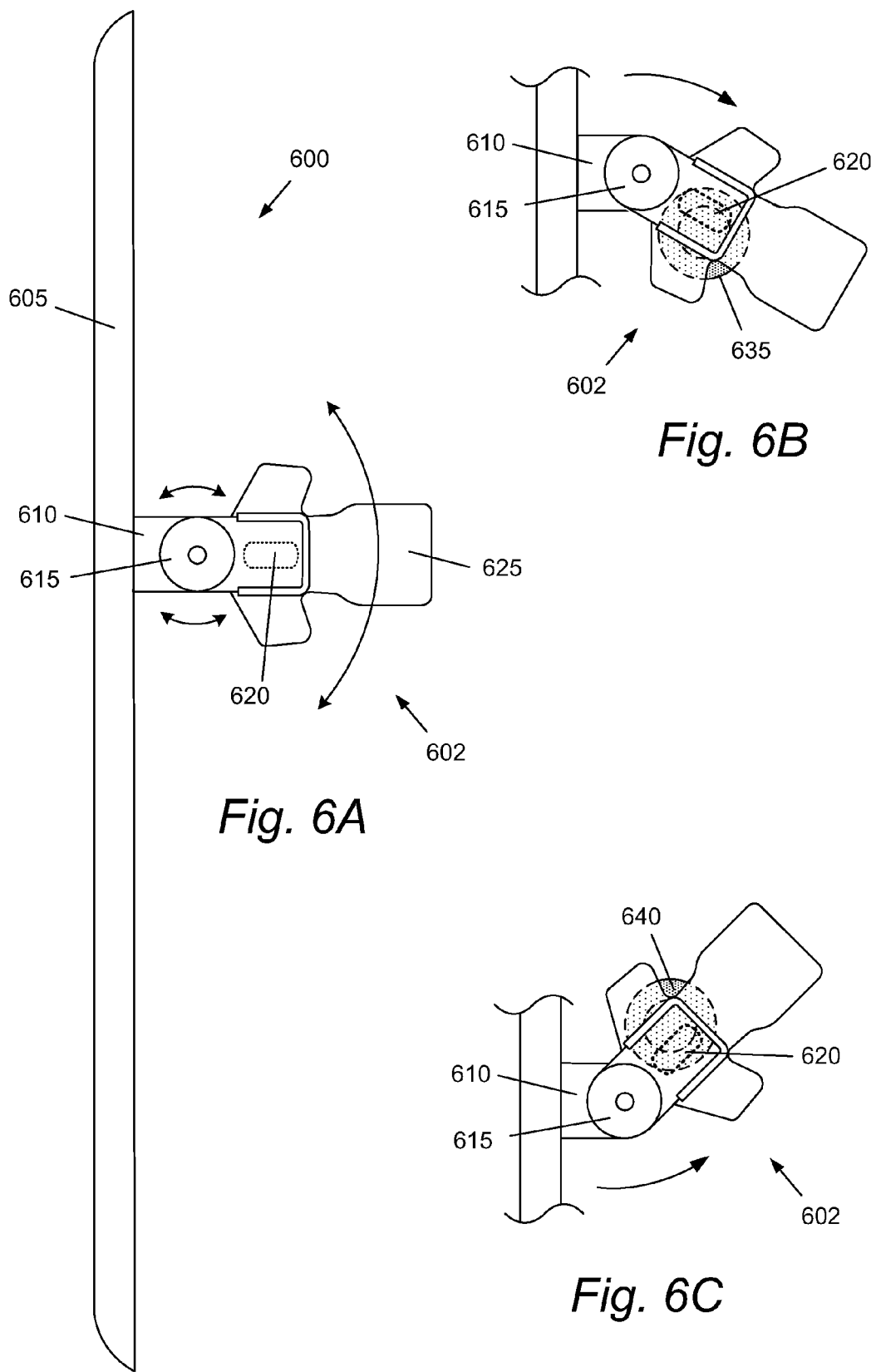
FIGS. 6A-6C are diagrams of an active cover plate that includes a pivoting prong, according to one example of principles described herein.

FIGS. 6A-6C shows one example of an active cover plate (600) with a spring clip (602) that rotates to reach screw terminals in different locations. In this implementation the spring clip (602) includes a base (610) that is connected to the faceplate (605). A pivot (615) connects a head portion of the spring clip (602) to the base (610). The head portion of the spring clip (602) includes a contact (620) and a nonconductive portion (625).

The head portion of the spring clip (602), including the nonconductive portion and contact/rivet can be rotated about the pivot (615) to reach screw terminals that are below (FIG. 6B) or above (FIG. 6C) the base (610) of the spring clip (602). FIG. 6B shows the head portion of the spring clip (602) has been rotated clockwise about the pivot (615) so that the contact (620) makes an electrical connection with an underlying screw head (635) below the base (610) of the spring clip (602). FIG. 6C shows the head portion of the spring clip (602) has been rotated counter clockwise so that the contact (620) makes electrical contact with an underlying screw head (640) that is above the base (610) of the spring clip (602). The pivot (615) is constructed to maintain electrical continuity between the electrical contact (620) and the base (610) during and after rotation of the head portion of the spring clip (602).

FIGS. 7A-7D show one example of an active cover plate (700) that includes a spring clip (705) that is specifically designed to be adjustable in the depth direction (horizontally, along the X axis as show in FIG. 2A). This spring clip (705) includes two different contacts (710, 715). A first contact (710) is closer to the base of the spring clip (705) and a second contact, or more distal contact (715) is closer to the tip of the spring clip (705). The more distal contact (715) allows the spring clip (705) to contact screw terminals that are significantly farther away from the face plate (755). For example, the more distal contact (715) may be used to contact screw terminals of a GFCI outlet body.

The spring clip (705) may be used with both contacts (710, 715) bare or may include a sliding cover (730) that can be moved along the body (720) of the spring clip (705) to selectively cover one of the contacts (710, 715). This sliding cover (730) can be used to prevent the contact (710, 715) that is not in direct contact with the screw terminal from shorting or coming into electrical contact with other elements.

Figure 7A:
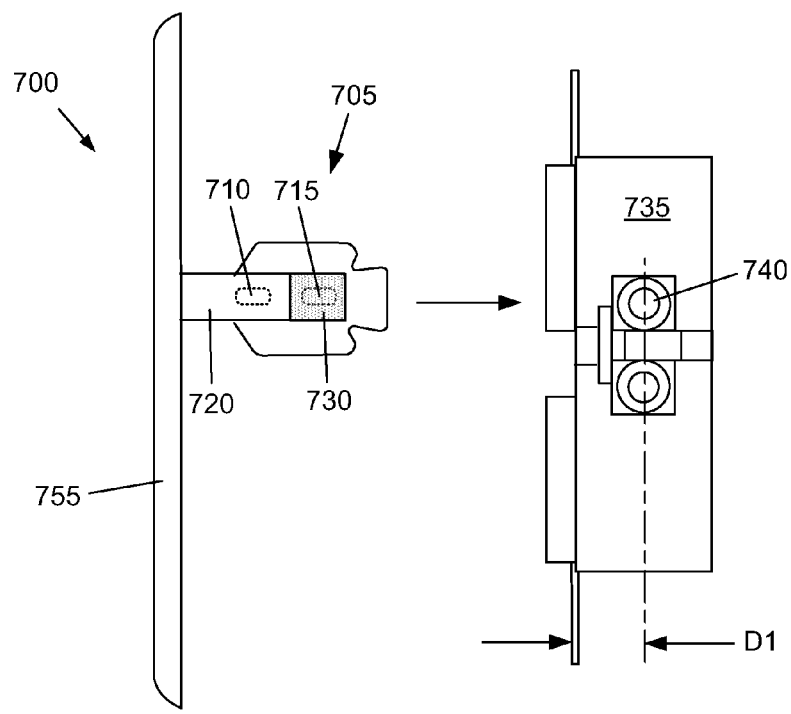
FIGS. 7A-7D are diagrams of prongs with multiple contacts and a sliding insulator, according to one example of principles described herein.

In FIG. 7A, the active cover plate (700) is placed over a standard duplex outlet body (735) with screw terminals (740) that are only a relatively short distance D1 from the face of the outlet body (735). Thus, the sliding cover (730) is moved over the more distal contact (715) to insulate it. When placed over the standard duplex outlet (735) the contact (710) that is closer to the base contacts the screw terminal (740).

Figure 7B:
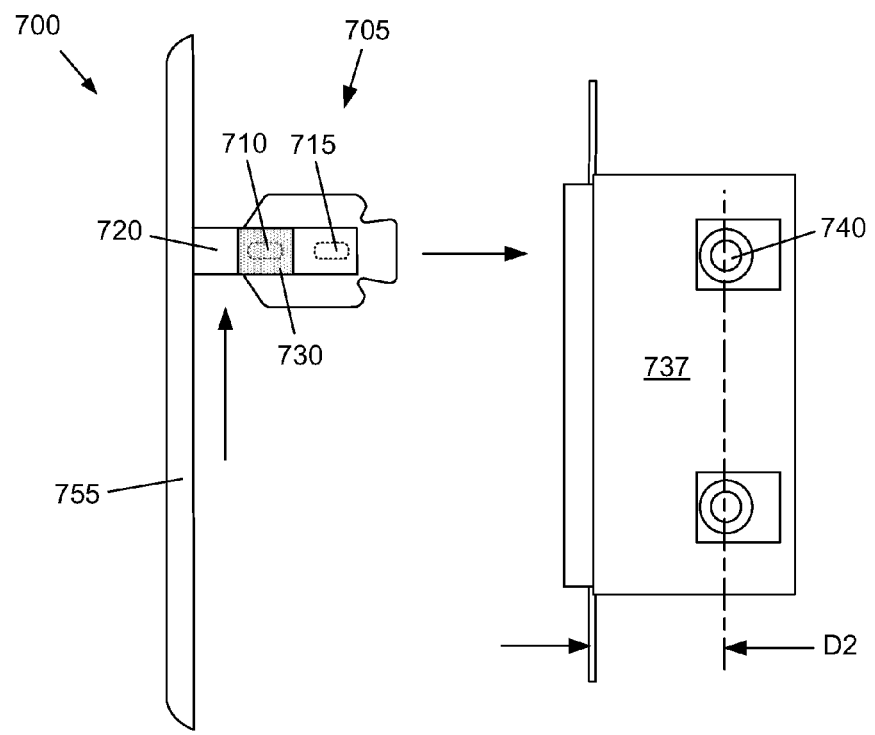

FIG. 7B shows the active cover plate (705) being placed over a GFCI outlet body (737). The screw terminals (740) on the GFCI outlet body (737) are significantly farther way from the face of the outlet body (distance D2). Additionally, the vertical location of the screw terminals (740) is not the same as the duplex outlet body (735, FIG. 7A). To make an electrical connection with the screw terminal (740), the spring clip (705) is slid vertically up the face plate (755) using any of a number of mechanisms and the sliding cover (730) is slid along the body (720) of the spring clip to cover the contact (710) closest to the face plate (755). The active cover plate (700) can then be connected over the GFCI outlet body (737) and the more distal contact (715) will contact the screw terminal (740). In some examples there may be two different terminals on the same side of a receptacle body. For example, switch bodies may have two screw terminals on the same side. In this case, the active cover plate may have to spring clips on the same side to make the desired contact with the screw terminals.

Figure 7C:
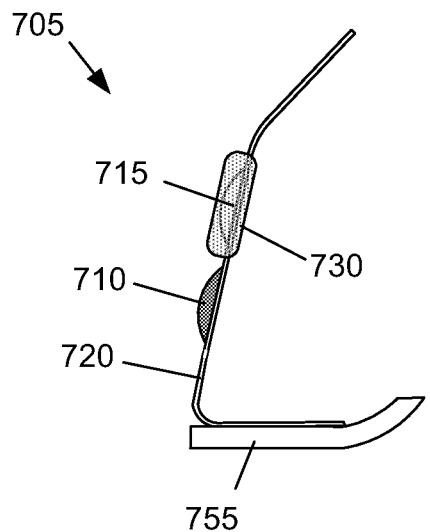
Figure 7D:
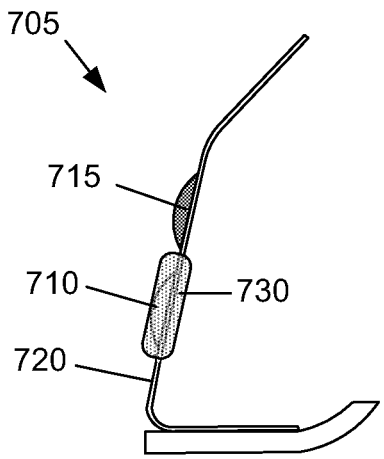

FIGS. 7C and 7D are side views of the spring clip (705) with the nonconductive portion (305, FIG. 3D) removed. As discussed above, body (720) has several contacts (710, 715) along its length that are positioned to make contact with screw terminals on various styles of outlet/receptacle bodies. The body (720) is connected to the face plate (755). When the target screw terminal is at a relative shallow depth, the first contact (710) near the face plate is exposed and the more distal contact (715) from the face plate (755) is covered by the sliding cover (730). This configuration is shown in FIG. 7C. The configuration shown in FIG. 7D is for making contact with screw terminals that are at a greater depth from the face of the receptacle body. The sliding cover (730) is moved over the first contact (710) near the face plate (755, FIG. 7A) and the more distal contact (715) from the face plate (755, FIG. 7A) is exposed.

Figure 8:
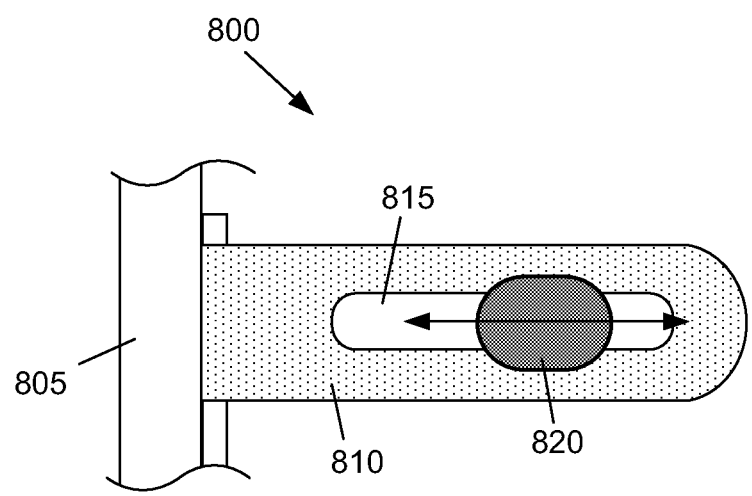
FIG. 8 is a diagram of a spring clip with a sliding contact, according to one example of principles described herein.

FIG. 8 is a diagram of an alternative implementation of a depth adjustable spring clip (800) mounted to a face plate (805). In this example, the body (810) of the spring clip (800) has a slot (815) along its length and the contact (820) slides back and forth in the slot to achieve the desired depth. The body (810) of the spring clip (800) may be conducting and the contact (820) may be electrically connected to the body (810). Additionally or alternatively, the contact (820) may have a flexible conductor connected to it that transfers power to the circuitry inside the active cover plate.

Figure 9A:
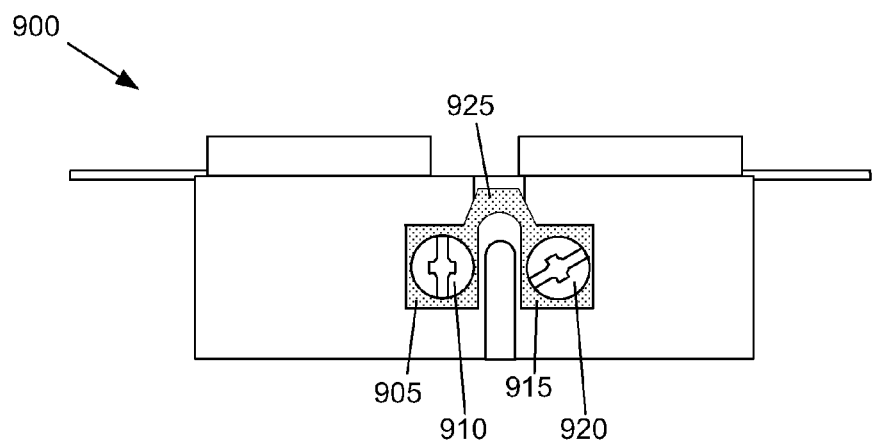
FIG. 9A-9C describe geometries and techniques to avoid arcing between adjacent screw terminals on the side of an outlet, according to one example of principles described herein.
Figure 9B:
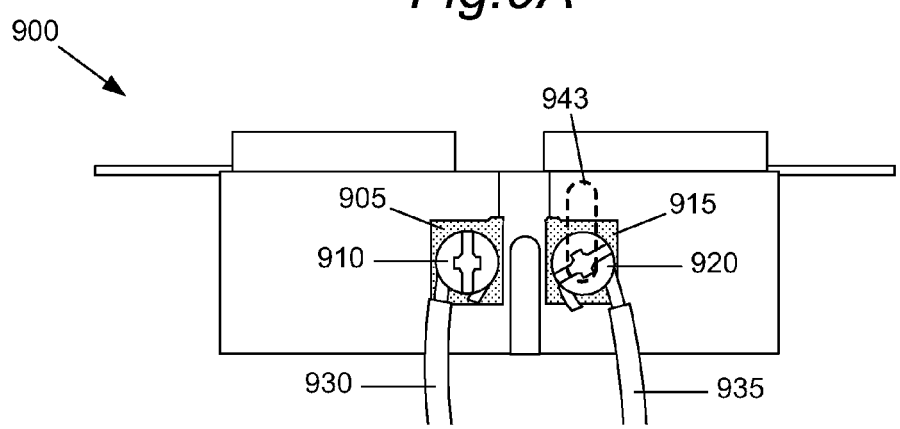

In some outlet/receptacle bodies there are terminals that have two screws/screw pads that are in relatively close proximity. FIG. 9A shows this type of outlet body (900), which includes a first screw (910) and first screw pad (905) and a second screw (920) and a second screw pad (915). The first screw pad (905) and the second screw pad (915) are connected by a breakout tab (925). By removing the breakout tab (925) the terminal can be divided into two electrically separate parts. This is illustrated in FIG. 9B, where a first part includes the first screw pad and screw (905, 910) and an electrical supply wire (930) electrically connected to the screw pad/screw (905, 910). The second part includes the second screw pad and screw (915, 920) and a second electrical supply wire (935) electrically connected to the second screw pad and screw (915, 920). The first part supplies electrical power to one of the outlets and the second part separately supplies electrical power to the other outlet. This may be useful in a variety of situations. For example, one of the outlets may be connected to switch and a lamp plugged into the outlet. This allows the switch to control the lamp. However, the other outlet may be used for general purpose connections and may be on all the time. By dividing the terminal, one of the outlets may be separately controlled by the switch while the other outlet has continuous power.

However, if the contact pad on the spring clip that contacts the first and/or second parts of the screw terminal is very wide, it may cause arcing or shorting between the first part and second part of the terminals. To avoid this, the contacts may be relatively narrow. An outline (943) of a contact is superimposed on the divided terminal. Because the contact is relatively narrow, it will have a reduced likelihood of causing arcing or shorting as it moves or is placed over the divided terminal. For example a contact with an oblong or narrow rectangle shape may be used, where the width of the contact is significantly smaller than the distance between two adjacent screws/pads. The term "significantly smaller" refers to a dimension that prevents arcing when the spring clip slides between the two adjacent screw/pads during installation or adjustment.

Figure 9C:
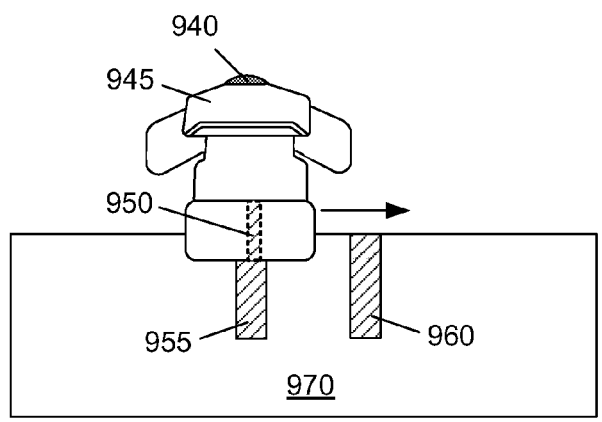

FIG. 9C shows an additional safety precaution that could be implemented in an active cover plate. In this implementation, the spring clip (945) is only electrically connected to the active cover plate (970) when it is in one of a predetermined number of locations. This is accomplished by forming pads (995, 960) on the face plate or sandwich plate and forming a corresponding spring clip pad (950). When the spring clip pad (950) aligns with a pad or contact (955, 960) on the face plate/sandwich plate, an electrical current is delivered to the circuitry/load in the active cover plate (970). When the spring clip pad (950) is not aligned with the pads (955, 960) on the faceplate/sandwich plate, there is no electrical connection to the circuitry. For example, when the spring clip is moving or positioned in the area between two separated parts of a screw terminal, there would be no connection to the circuitry but when the spring clip was in the desired location and makes an electrical connection with only one of the screw terminals, the pads align to make the desired electrical connection to the circuit.

Figure 10A:
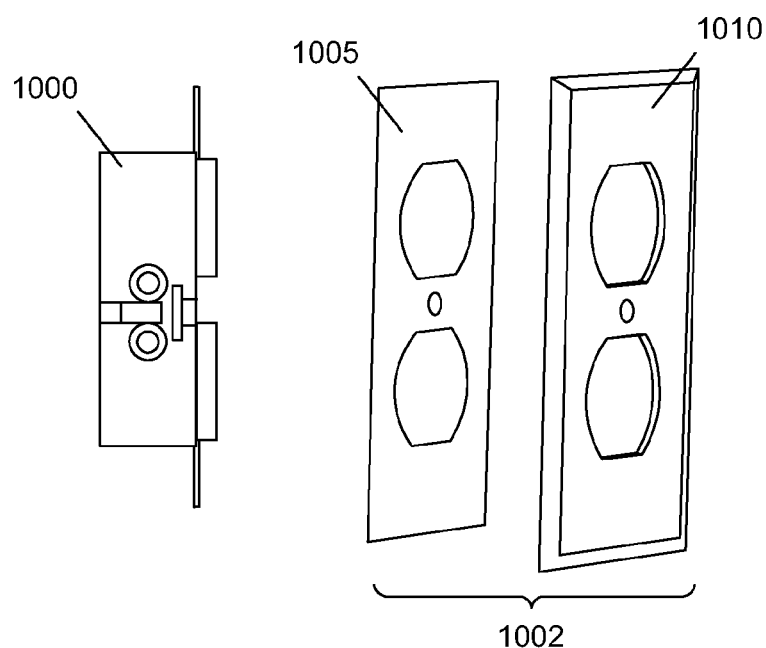
FIGS. 10A-10C are illustrative examples of intermediate devices that could form an interface between an outlet and an active cover plate, according to one example of principles described herein.
Figure 10B:
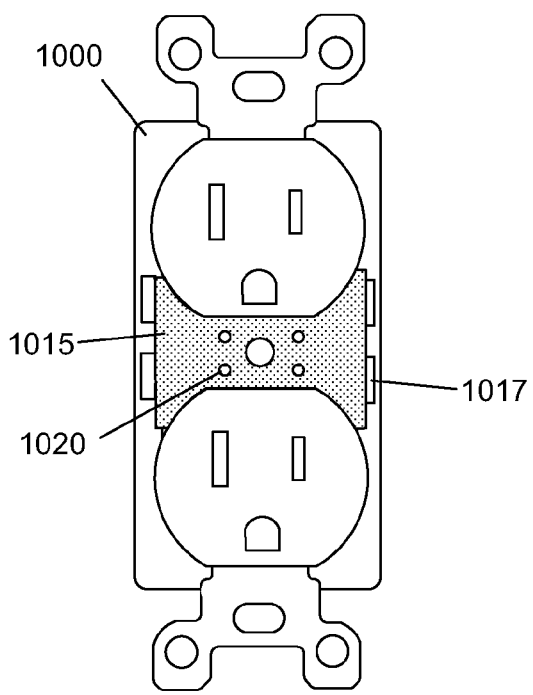
Figure 10C:
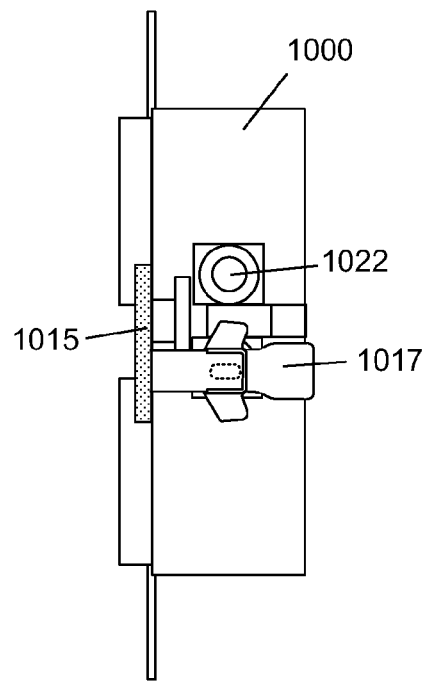

FIGS. 10A-10C show examples of active cover plates that include intermediate elements that could be interposed between the receptacle body and the face plate. The intermediate elements could be adapted to specific outlets while presenting a uniform interface to the face plates. This allows the face plates to be identical for outlet/switch bodies of the same type but with different screw terminal locations. For example, the same face plate could be used for all duplex outlet bodies, with different intermediate elements compensating for the differences in screw terminal locations.

FIG. 10A shows an outlet body (1000) and an active cover plate (1002) that includes an intermediate element (1005) and a face plate (1010) that connects over the outlet body (1000) and intermediate element (1005). The intermediate element (1005) in this example fits over the face of the outlet body (1000). The intermediate element (1005) may electrically connect to the outlet body (1000), include power conditioning circuitry, and may provide an interface to present power and/or signals to the face plate (1010).

FIGS. 10B and 10C are a front view and a side view respectively of an outlet body (1000) with an intermediate element (1015). In this example, the intermediate element (1015) includes spring clips (1017) and surface contacts (1020). As shown in FIG. 10C, the spring clips (1017) contact the screw terminals (1022) on the side of the outlet body (1000). Electrical power is then routed (and potentially conditioned into lower voltage direct current) through the intermediate element (1015) and presented to a face plate (1010, FIG. 10A) by the surface contacts (1020).

Alternatively or additionally, presentation of the power may be through another mechanical interface, such as a pin/prong interface, or through wireless power transfer, such as between coils. Other options include intermediate devices that contact the screw terminals on the receptacle body and then transfer the power to electrical pads on a different location on the sides of the outlet/switch body. In this example, an active cover plate with spring clips that would ordinarily not be able to contact the screw terminals could be used to contact the electrical pads on the exterior of the intermediate element. In general, the intermediary devices are plug and play devices that do not require removal of the outlet to install. Further, the intermediary devices are not merely a hard wired connection between an outlet and a face plate. Installation of the intermediary device is typically a tool-less operation that does not require reconfiguration of the receptacle body.

Figure 11:
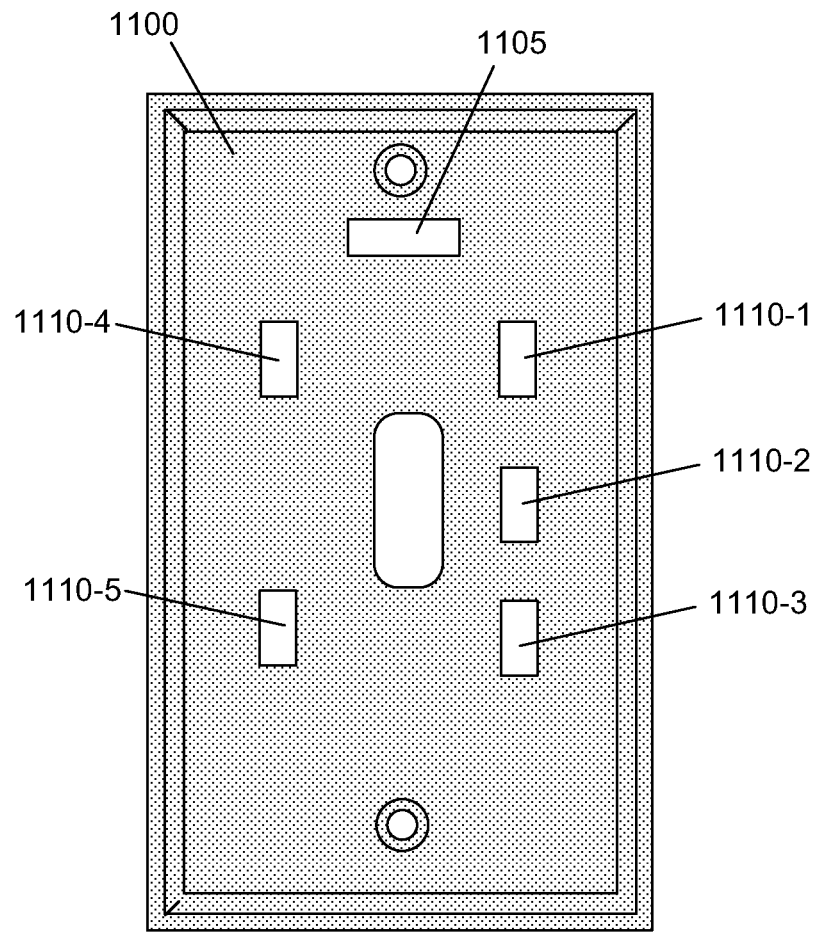
FIG. 11 is a diagram showing possible locations of multiple prongs on a cover plate, according to one example of principles described herein.

There are a variety of additional ways that active cover plates could be designed for more universal use with a range of receptacle bodies. One approach is to build multiple prongs and/or contacts onto the active cover plate and then use only the prongs that are connected to active terminals. The remaining prongs may not contact a terminal or may contact a terminal that is not electrified (i.e. a ground terminal). FIG. 11 is a diagram that shows potential locations for various prongs on an active switch cover plate (1100). In this example, there is a ground contact (1105) that may contact the chassis of the receptacle body. A number of spring clips (1110-1, 1110-2, 1110-3, 1110-4, and 1110-5) are distributed on the active switch cover plate (1100). Some of the spring clips may be active in one configuration and not in other configurations. For example, in three way and four way light switch bodies, some of the screw terminals may be active in one configuration (i.e. when the light is ON) and other screw terminals may be active in a different configuration (i.e. when the light is OFF). The use of multiple spring clips/contacts allows for the active cover plate to connect to a wider variety of receptacle bodies and to adapt to various operational configurations of the receptacle bodies.

FIGS. 12A-12D show various diagrams of an active cover plate that includes vertically adjustable spring clips with hinge joints. The hinge joints allow the spring clips to be packaged and shipped flat. This can provide a number of advantages including lowering the cost of shipping, decreasing the size and weight of packaging, and protecting the spring clips from damage. FIG. 12A shows a cross sectional view of an active cover plate (1200) that has two hinged spring clips (1215, 1220) that are folded down for shipping or storage. In this simplified diagram the active cover plate (1200) includes a face plate (1205) and hinges (1210, 1225). Before the active cover plate (1200) is installed, the spring clips (1215, 1220) are brought into the upright position so that they extend rearward from the faceplate as shown in FIG. 12B.

In some examples the hinges are designed to be conductive throughout their range of motion. In other examples, the hinges may only be conductive in their raised position. Alternatively, the hinges may not be conductive. In this case the contact and moving part of the spring clip may be connected to circuitry in the active cover plate by a flexible wire or make an electrical contact in their upright position. In one implementation, the spring clips lock into their upright position. In this example, a latching mechanism (1212) engages with the spring clip when the spring clips are raised. The latching mechanism holds the spring clip in the upright position and prevents the hinge joint from rotating after the latch engages with the spring clip. In other implementations, the spring clips may be held in their raised position by pressure from the contact on the outlet/switch body.

FIGS. 12C and 12D show an implementation where the hinged spring clip (1220) is also vertically adjustable (its position is adjustable in the plane of the face plate) to allow the active cover plate (1200) to be used in conjunction with a wider range of outlet bodies. In this example, the spring clip (1220) includes a slider (1235) that slides in a slot (1230) in the face plate (1205). The hinge (1210) is also shown with the latching mechanism (1212). In this example, the latching mechanism (1212) includes a ramp and a slot. When the spring clip is raised, it engages with the ramp on the latching mechanism and then clicks into the slot. This secures the spring clip (1220) in the desired upright position. In FIG. 12C, the spring clip (1220) is in a central position and can be moved either up or down in the slot (1230). In FIG. 12D, the spring clip (1220) has been moved upward in the slot (1230) by manually moving the slider (1235). Although the figures above show hinges that allow the spring clips to lay flat and be raised, there are a variety of other mechanisms that could be used, including flexures, joints, or other suitable rotational mechanisms.

Figure 13:
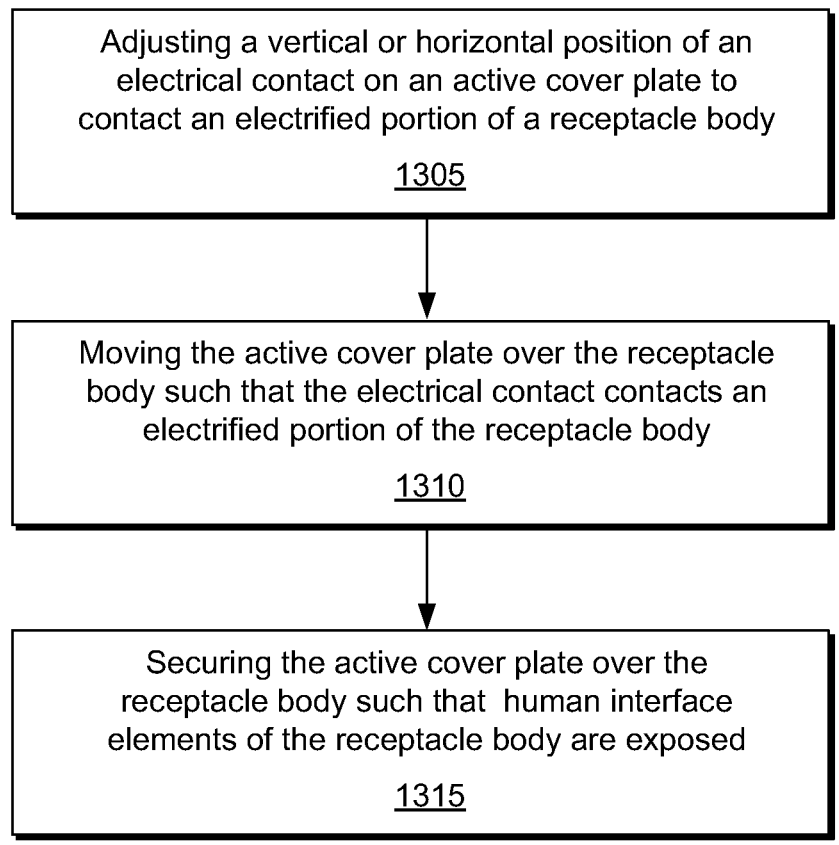
FIG. 13 is a flow chart of a method for connecting an active cover plate over a receptacle body according to one example of principles described herein.

FIG. 13 is a flowchart of an illustrative method (1300) for connecting an active cover plate over a receptacle body. The method includes adjusting a vertical or horizontal position of an electrical contact on an active cover plate to contact an electrified portion of a receptacle body (block 1305). For example, adjusting a vertical or horizontal position of the electrical contact with respect to faceplate may include vertically moving or sliding a spring clip supporting the electrical contact with respect to the faceplate. There are several examples of this given above: selecting which posts the spring clip is placed over, moving the spring clip so that a detent engages with a selected indention, lifting a tab out of a groove and sliding the spring clip to a desired location and releasing the tab to engage with a different groove, engaging protrusions on the faceplate or sandwich plate with slots in the spring clip, or other techniques. Examples of moving the electrical contact in a horizontal direction includes sliding a contact along a slot in the spring clip or covering unused contacts on the spring clip to expose only a contact that has the desired horizontal position (depth).

The active cover plate is then moved over the receptacle body such that the electrical contact contacts an electrified portion of the receptacle body (block 1310). As discussed above, the shape of the nonconductive portion of the spring clip can facilitate/guide the active cover plate over the receptacle body. The active cover plate is secured over the receptacle body such that human interface elements of the receptacle body are exposed (block 1315). For example, a screw can be inserted through a hole in the active cover plate and threaded into the receptacle body. The human interface elements include any portion of the receptacle body that humans interface with, such as switches and electrical receptacles.

In summary, an active cover plate may include a faceplate, a load, and a spring clip adjustable in at least one of a horizontal direction and a vertical direction with respect to the faceplate. The spring clip electrically interfaces with a receptacle body and extracts electrical power from the receptacle body to energize the load. The receptacle body may include a variety of devices that receive electrical power from building wiring, including outlet and switch bodies. In some embodiments, the spring clip may include a flexible conductive portion connected to the faceplate by a first end and a nonconductive portion connected to an opposite end of the flexible conductive portion.

The non-conductive portion may have a wide range of shapes and features. In one example, the non-conductive portion includes a main ramp portion extending from the flexible conductive portion, wherein the main ramp portion is to guide the active cover plate over the receptacle body as the active cover plate is pushed toward the receptacle body. The non-conductive portion may also include wings extending laterally away from the main ramp portion and the flexible conductive portion, wherein the wings are angled to guide the spring clips over screw terminals on the receptacle body when the active cover plate is moved vertically relative to the receptacle body.

A fastener joins the non-conductive portion and the flexible conductive portion, wherein the fastener is configured to make electrical contact with screw terminals on the receptacle body. The flexible conductive portion may include at least one reverse curve between a midpoint of the flexible conductive portion and a base portion.

The spring clip may be configured to be mounted in at least two different vertical positions on the faceplate. For example, the spring clip may include at least two apertures to receive at least two protrusions on the faceplate. The faceplate may include a number of the protrusions such that by selecting at least two protrusions on the faceplate and placing the protrusions into the apertures, the spring clip can be located in a desired vertical position on the faceplate. The protrusions may have a variety of configurations, including a linear array of posts extending from the faceplate. The spring clip then includes at least two apertures configured to receive at least two of the posts such that by selecting at least two post in the linear array of posts the spring clip can be located in one of a least two predetermined vertical positions on the faceplate.

The spring clip may be adjustable before and/or after complete assembly of the active cover plate. In one implementation, the spring clip is configured to slide vertically with respect to the faceplate into plurality of predetermined positions. For example, the spring clip may be secure in a plurality of predetermined positions by a detent engaging with a notch at each of the predetermined positions. Additionally or alternatively, the spring clip may be secured in the plurality of predetermined positions by a spring tab engaging with a groove in each of the predetermined positions. Additionally or alternatively, the spring clip is secure in the plurality of predetermined positions by a protrusion engaging in a slot in the spring clip at each of the predetermined positions. The spring clip may also include a base connected to the faceplate, a head, and a pivot interposed between the base and the head. The pivot is configured to swing the head to contact a screw terminal above or below a base.

Additionally or alternatively, the spring clip may be adjustable in the horizontal direction to reach screw terminals at varying depths. For example, the spring clip may include multiple contacts at different horizontal locations along the spring clip. The spring clip may also include a sliding insulator moving to cover one of the multiple contacts that is not in use. In some implementations, the spring clip may conduct electrical energy to the load only at the predetermined positions.

The active cover plate may further include an intermediate device interfacing with both the receptacle body and the faceplate, wherein the intermediate device extracts power out of the receptacle body and conducts the power to the faceplate. In some examples, the active cover plate may include at least three spring clips with at least one of the spring clips not extracting power from the receptacle body. The spring clips may be connected to the faceplate with a hinge so that the spring clip can rotate into a position that is parallel to the faceplate. In some examples, the spring clip may be adjustable with respect to the face plate in both horizontal and vertical directions.

In one implementation, an active cover plate includes a faceplate comprising a linear array of posts, an electrical load, and a spring clip adjustable in at least one of a horizontal direction and a vertical direction with respect to the face plate to electrically interface with a receptacle body and extract electrical power from the receptacle body to energize the load. The spring clip includes a flexible conductive portion connected to the faceplate by a base portion with two apertures. A non-conductive portion connected to an opposite end of the flexible conductive portion includes a main ramp portion extending from the flexible conductive portion, wherein the main ramp portion is to guide the active cover plate over the receptacle body as the active cover plate is pushed toward the receptacle body. The non-conductive portion in this example also includes wings or ramps extending laterally away from a main ramp portion and flexible conductive portion, wherein the wings or ramps are angled to guide the spring clip over screw terminals on the receptacle when the active cover plate is moved vertically relative to a receptacle body. A fastener connects the non-conductive portion and flexible conductive portion. The fastener also makes electrical contact with screw terminals on the receptacle body. Each spring clip may be configured to be mounted in at least two different vertical positions along the face plate by placing the base with two apertures over two of the posts in the linear array of posts to select one of a plurality of predetermined vertical positions of the spring clip on the faceplate.

The preceding description has been presented only to illustrate and describe examples of the principles described. This description is not intended to be exhaustive or to limit these principles to any precise form disclosed. Many modifications and variations are possible in light of the above teaching.

What is claimed is:

1. An active cover plate comprising:
    a faceplate;
    a load; and
    a spring clip extending rearward from the faceplate to interface with a receptacle body, wherein the spring clip comprises:
        a flexible conductive portion connected to the face plate by a first end; and
        a non-conductive portion connected to an opposite end of the flexible conductive portion;
        wherein an electrical contact on the spring clip contacts a side screw terminal on the receptacle body to extract electrical power from the receptacle body to energize the load.

2. The active cover plate of claim 1, wherein the non-conductive portion comprises:
    a main ramp portion extending from the flexible conductive portion, wherein the main ramp portion is to guide the active cover plate over the receptacle body as the active cover plate is pushed toward the receptacle body.

3. The active cover plate of claim 2, wherein the main ramp portion is configured to engage a wall of a receptacle box surrounding the receptacle body.

4. The active cover plate of claim 3, wherein the main ramp portion comprises a terminal curve configured to glide along the wall of the receptacle box.

5. The active cover plate of claim 2, wherein the flexible conductive portion is angled forward toward a middle of the faceplate and the main ramp portion is angled away from the center of the faceplate.

6. The active cover plate of claim 2, wherein the non-conductive portion further comprises a skirt extending downward along a back side of the flexible conductive portion, wherein the non-conductive portion completely insulates the back side of the flexible conductive portion.

7. The active cover plate of claim 2, wherein the electrical contact comprises a major axis and a minor axis, wherein the major axis of the electrical contact is oriented to contact a range of screw terminals located at different depths from a front of the receptacle body.

8. The active cover plate of claim 1, wherein the flexible conductive portion comprises at least one reverse curve.

9. The active cover plate of claim 1, wherein the active cover plate further comprises an intermediate device interfacing with both the receptacle body and the faceplate, wherein the intermediate device extracts power out of the receptacle body and conducts the power to the faceplate.

10. The active cover plate of claim 1, wherein the active cover plate comprises at least three spring clips with at least one spring clip not extracting power from the receptacle body.

11. An active cover plate comprising:
    a faceplate;
    an electrical load; and
    a spring clip comprising an electrical contact on the spring clip to contact a side screw terminal on the receptacle body and wherein a portion of the spring clip is configured to contact a wall of a receptacle box surrounding the receptacle body.

12. The active cover plate of claim 11, wherein the portion of the spring clip that contacts the wall of the receptacle box is nonconductive.

13. The active cover plate of claim 11, wherein the portion of the spring clip that contacts the wall of the receptacle box comprises a main ramp configured to guide the active cover plate over the receptacle body as the active cover plate is pushed toward the receptacle body.

14. The active cover plate of claim 11, wherein the portion of the spring clip that contacts the wall of the receptacle is flexible and conforms to the wall of the receptacle box.

15. The active cover plate of claim 11, wherein contact between the portion of the spring clip and the wall of the receptacle box presses the electrical contact on the spring clip against a screw terminal on the receptacle body.

16. The active cover plate of claim 11, wherein contact between the portion of the spring clip and the wall of the receptacle box prevents permanent deformation of a flexible conductive portion of the spring clip.

17. The active cover plate of claim 11, wherein the portion of the spring clip contacting the wall of the receptacle box comprises a main ramp portion with a terminal curve configured to glide along the wall of the receptacle box.

\* \* \* \* \*